United States Patent
Kawabata et al.

(10) Patent No.: US 8,579,493 B2
(45) Date of Patent: Nov. 12, 2013

(54) DISPLAY DEVICE AND TELEVISION RECEIVER

(75) Inventors: Ryota Kawabata, Osaka (JP); Motoaki Okitsu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 426 days.

(21) Appl. No.: 13/130,082

(22) PCT Filed: Sep. 7, 2009

(86) PCT No.: PCT/JP2009/065571
§ 371 (c)(1),
(2), (4) Date: May 19, 2011

(87) PCT Pub. No.: WO2010/061678
PCT Pub. Date: Jun. 3, 2010

(65) Prior Publication Data
US 2011/0221980 A1    Sep. 15, 2011

(30) Foreign Application Priority Data
Nov. 28, 2008    (JP) ................................ 2008-304349

(51) Int. Cl.
*F21V 7/04*    (2006.01)

(52) U.S. Cl.
USPC ............ 362/633; 362/97.1; 348/794; 349/58; 361/679.21

(58) Field of Classification Search
USPC .......... 348/794; 349/58, 60, 153; 361/679.21, 361/679.22; 362/97.1, 97.2, 433, 632–634
See application file for complete search history.

(56) References Cited

U.S. PATENT DOCUMENTS

| 6,175,396 B1 | 1/2001 | Kim et al. |
| 2007/0284496 A1 | 12/2007 | Yokota |
| 2009/0009680 A1 | 1/2009 | Zensai |
| 2010/0142128 A1 | 6/2010 | Takechi |

FOREIGN PATENT DOCUMENTS

| JP | 11-281966 A | 10/1999 |
| JP | 2001-091947 A | 4/2001 |
| JP | 2003-316274 A | 11/2003 |
| JP | 2008-197167 A | 8/2008 |
| RU | 2172974 C2 | 8/2001 |
| RU | 2007115869 A | 11/2008 |
| WO | 2008/120615 A1 | 10/2008 |

OTHER PUBLICATIONS

Official Communication issued in International Patent Application No. PCT/JP2009/065571, mailed on Dec. 1, 2009.
English translation of Official Communication issued in corresponding Russian Patent Application No. 2011121146, mailed on Jul. 30, 2012.

*Primary Examiner* — Stephen F Husar
(74) *Attorney, Agent, or Firm* — Keating & Bennett, LLP

(57) ABSTRACT

A liquid crystal display device 10 includes a liquid crystal panel 11, an optical member 16, a plurality of elongated parts 31, a plurality of joint parts 30, a frame 17, a chassis 14, cabinets Ca and Cb, mounting structures and displacement allowance structures. The liquid crystal panel 11 and the optical member 16 are capable of light transmission. The elongated parts 31 extend along edges of the liquid crystal panel 11 and the optical member 16. The joint parts connect the elongated parts. The frame 17 is formed in a frame-like shape and holds the edges of the liquid crystal panel 11 and the optical member 16. The frame 17 is mounted to the chassis 14 and the cabinets Ca and Cb. The mounting structures are included in the joint parts 30 of the frame 17, the chassis 14 and the cabinets Ca and Cb for binding them in mounting conditions. The displacement allowance structures are provided at joint portions between the elongated parts 31 and the elongated parts 30. The displacement allowance structures allow movement of the elongated parts 31 in the extending directions thereof relative to the joint parts 30.

25 Claims, 21 Drawing Sheets

DISPLAY DEVICE AND TELEVISION RECEIVER

TECHNICAL FIELD

The present invention relates to a display device and a television receiver.

BACKGROUND ART

A liquid crystal display device, which is one kind of display devices, generally has a configuration in which a backlight unit that is an external light source is arranged behind a liquid crystal panel configured to display images. The liquid crystal panel is held between a bezel and a frame. The bezel is formed in a frame-like shape so as to surround a display area and arranged on the front side. The frame included in the backlight unit is formed in a frame-like shape and arranged on the rear side.

In recent years, liquid crystal display devices tend to be increased in size. The bezel and the frame having a plurality of parts and assembled from those parts are designed. An example is disclosed in Patent Document 1.

Patent Document 1: Japanese Published Patent Application No. 2008-197167

Problem to be Solved by the Invention

The bezel and the frame may have mounting holes provided as mounting structures. The bezel and the frame are mounted to the chassis, which is a housing of the backlight unit, and the cabinets, which are exterior trim parts of the liquid crystal display device, with the mounting structures. In this case, protrusions from other parts, such as bosses and screws, are inserted in the mounting holes.

When an ambient temperature inside the liquid crystal display device changes, components of the liquid crystal display device may thermally expand or contract. If the frame or the bezel thermally expands or contracts, the mounting holes move relative to the protrusions. As a result, movements of edges of the holes are stopped by the protrusions and thus stresses are applied to the edges and the protrusions. This may cause the following problems. Abnormal sounds may be produced by the edges of the holes rubbing against the protrusions due to the thermal expansion of contraction. The frame or the bezel may be deformed when the thermal expansion thereof is restricted by the protrusions. A mounting condition of the mounting structures may change.

In the liquid crystal display device in a large size, variations in dimensions of the frame and the bezel due to thermal expansions and contractions tend to be large. Therefore, solutions for the above problems are needed.

DISCLOSURE OF THE PRESENT INVENTION

The present invention was made in view of the foregoing circumstances. An object of the present invention is to reduce the stresses that may be applied to the mounting structures when a holding fixture thermally expands or contracts so as not to produce problems related to the stresses.

Problem to be Solved by the Invention

To solve the above problem, a display device of the present invention includes a plate capable of light transmission, a holding fixture, a mount, mounting structures and displacement allowance structures. The holding fixture is formed in a frame-like shape with a plurality of elongated parts extending along edges of the plate and a plurality of joint parts connecting the elongated parts. The holding fixture holds the edges of the plate. The holding fixture is mounted to the mount. The mounting structures are provided in the joint parts of the holding fixture and the mount for holding the holding fixture and the mount in a condition that the holding fixture is mounted to the mount. The displacement allowance structures are provided in joint portions of the elongated parts and the joint parts for allowing movements of the elongated parts relative to the joint parts along extending direction in which the elongated parts extend.

Even when the elongated parts thermally expand or contract according to an ambient temperature change, the displacement allowance structures allow movements of the elongated parts relative to the joint parts having the mounting structures in the extending directions. Therefore, stresses are less likely to be applied to the mounting structures even when the elongated parts thermally expand or contract.

BEST MODE FOR CARRYING OUT THE INVENTION

<First Embodiment>

Figure 2:
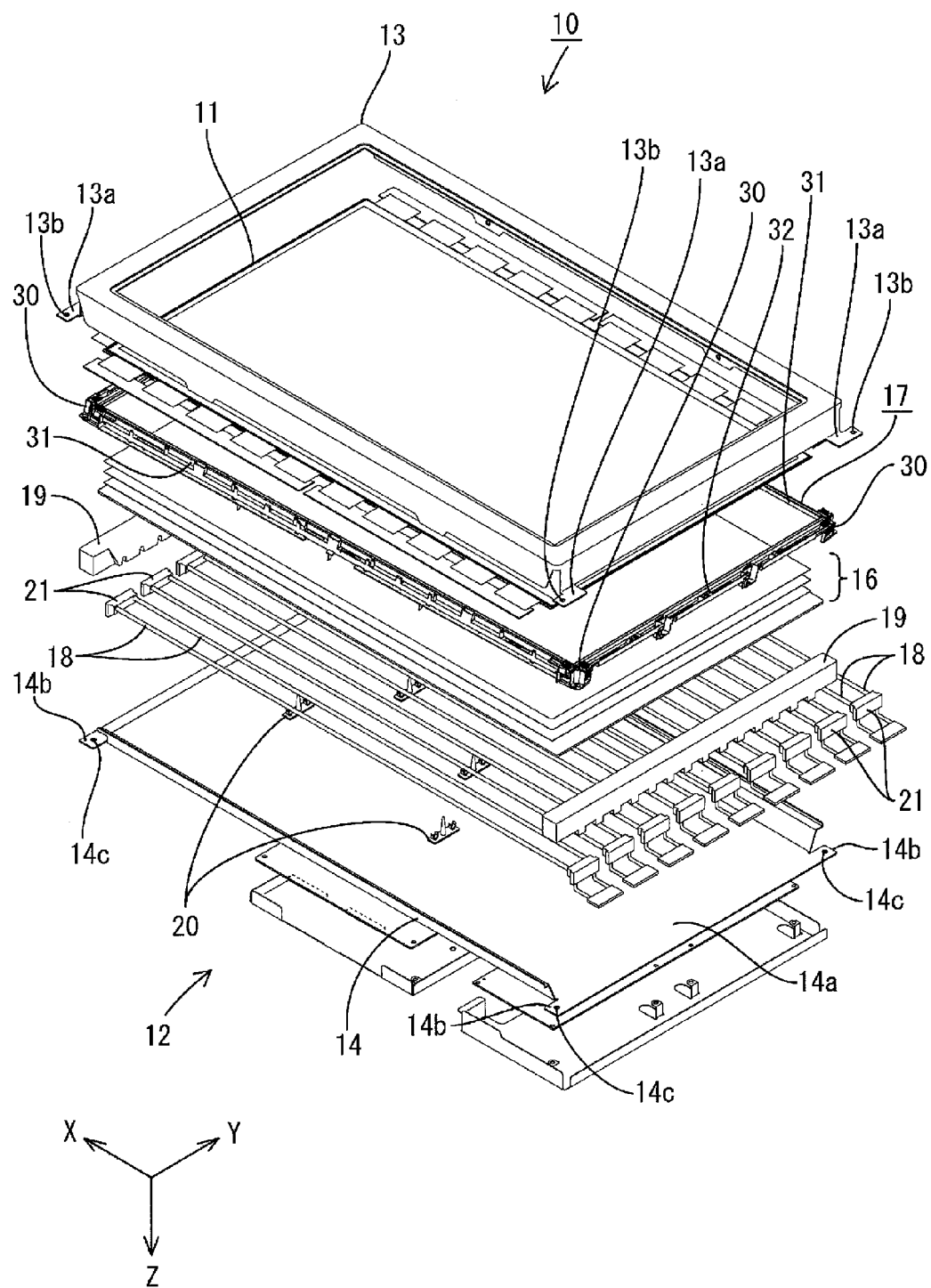
FIG. 2 is an exploded perspective view illustrating a general construction of a liquid crystal display device.
Figure 3:
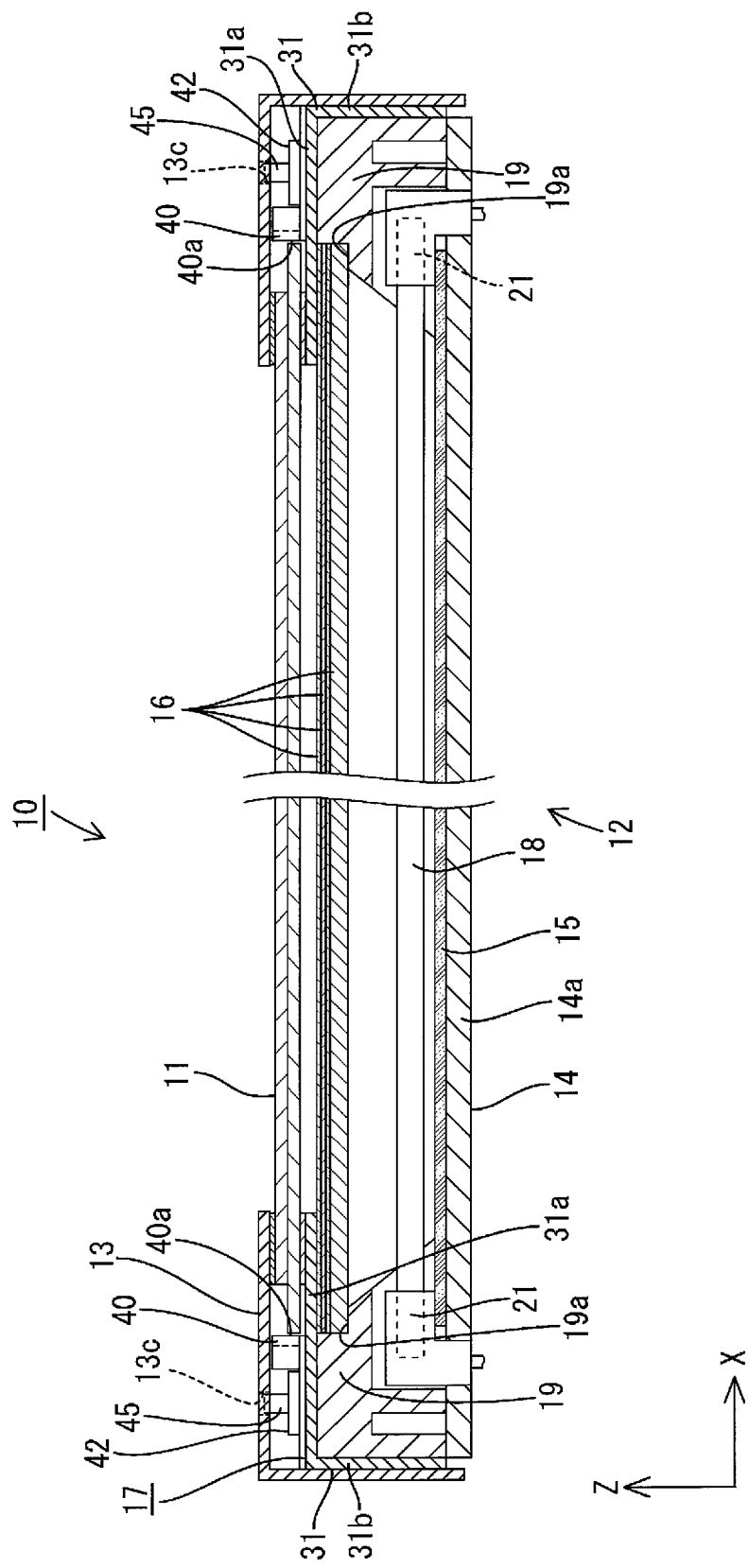
FIG. 3 is a cross-sectional view of the liquid crystal display device along a long-side direction.

The first embodiment of the present invention will be explained with reference to FIGS. 1 to 18. A liquid crystal display device 10 will be explained as an embodiment. X-axes, Y-axes and Z-axes in some drawings correspond to each other so as to indicate the respective directions. In FIGS. 2 and 3, the upper side and the lower side correspond to the front-surface side and the rear-surface side, respectively.

Figure 1:
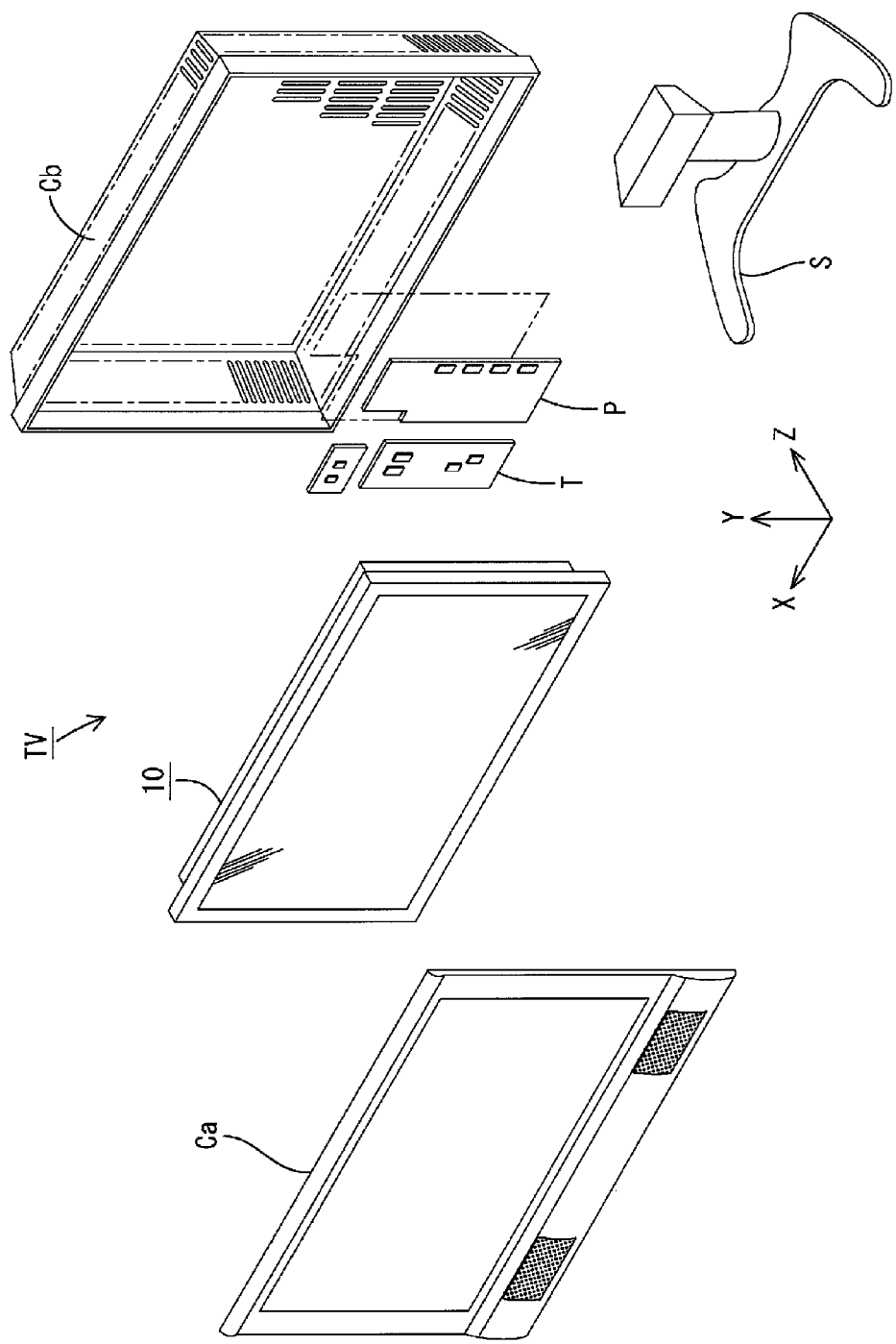
FIG. 1 is an exploded perspective view illustrating a general construction of a television receiver according to the first embodiment of the present invention.

As illustrated in FIG. 1, the television receiver TV includes the liquid crystal display device 10 (a display device), front and rear cabinets Ca and Cb, a power source P, a tuner T and a stand S. The cabinets Ca and Cb hold the liquid crystal display device 10 from the outside so as to sandwich the liquid crystal display device 10 therebetween. The liquid crystal display device 10 is housed in the cabinets Ca and Cb. The liquid crystal display device 10 has a landscape rectangular overall shape. As illustrated in FIGS. 2 and 3, the liquid crystal display device 10 includes a liquid crystal panel 11, which is a display panel, and a backlight unit 12 (a lighting device), which is an external light source. The liquid crystal panel 11 and the backlight unit 12 are held together by a frame-shaped bezel 13.

The liquid crystal panel 11 included in the liquid crystal display device 10 is a rectangular in plan view. As illustrated in FIG. 3, the liquid crystal panel 11 includes a pair of transparent glass substrates (having high capability of light transmission) bonded together with a predetermined gap therebetween and liquid crystals (not shown) sealed between the substrates. On one of the glass substrates, switching components (e.g., TFTs), pixel electrodes and an alignment film are arranged. The switching components are connected to the source lines and the gate lines that are perpendicular to each other. The pixel electrodes are connected to the switching components. On the other glass substrate, color filters including R (red) G (green) B (blue) color sections in predetermined arrangement, a counter electrode and an alignment film are arranged. Image data and various control signals required for displaying images from a drive circuit board (not shown) are transmitted through the source lines, the gate lines and the counter electrode. Polarizing plates are arranged on outer surfaces of the glass substrates, respectively.

Next, an overview of the backlight unit 12 included in the liquid crystal display device 10 will be explained. As illustrated in FIGS. 2 and 3, the backlight unit 12 is a so-called direct backlight, that is, light sources are arranged closely behind the liquid crystal panel 11. The backlight unit 12 includes a chassis 14, a reflection sheet 15, a plurality of optical members 16, frames 17, a plurality of cold cathode tubes 18 (linear light sources), holders 19, and lamp clips 20. The chassis 14 has a box-like overall shape and an opening on the front-surface side (the light exit side, the liquid crystal panel 11 side). The reflection sheet 15 is placed inside the chassis 14. The optical members 16 are attached so as to cover the opening 14b of the chassis 14. The frames 17 have functions including holding the optical members 16 from the front-surface side. The cold cathode tubes 18 are arranged parallel to each other inside the chassis 14. Each holder 19 protects the respective ends of the cold cathode tubes 18 from the light and has light reflectivity. Each lamp clip 20 holds the middle section of the cold cathode tube 18.

The chassis 14 is made of metal such as aluminum. The chassis 14 includes a bottom plate 14a and side plates that rise from the corresponding side of the bottom plate 14a. The bottom plate 14a has a rectangular shape in plan view similar to the liquid crystal panel 11. The long-side direction and the short-side direction of the bottom plate 14a correspond to the X-axis direction and the Y-axis direction in each drawing. The bottom plate 14a is located behind the cold cathode tubes 18 so as to face the cold cathode tubes 18. Namely, the bottom plate 14a is located on a side opposite to the light exit side with respect to the cold cathode tubes 18. The chassis 14 includes mounting structures for the cabinets Ca and Cb, the frame 17 and the bezel 13. Specifically, the chassis 14 includes two pairs of tabs 14b as the mounting structures. Each tab 14b is provided at each end of the long side of the bottom plate 14a at the edge (each of the four corners) so as to extend outward along the Y-axis direction (the short-side direction). Each tab has a mounting hole that is a through hole in which a boss (a protrusion) that protrudes from either one of the cabinets Ca and Cb are inserted. The bosses are not shown in the drawings. The cabinets Ca and Cb are fixed together with screws (not shown) inserted into the bosses and tighten.

A reflection sheet 15 is made of synthetic resin in white that provides high light reflectivity. It is placed so as to cover about an entire area of the inner surface of the chassis 14. The reflection sheet 15 has a function of reflecting light from the cold cathode tubes 18 to the optical member 16 side (the light exit side) (see FIG. 3).

Each optical member 16 is a rectangular in plan view similar to the bottom plate 14a of the chassis 14 and the liquid crystal panel 11. The optical members 16 are made of synthetic resin capable of light transmission and arranged between the cold cathode tubes 18 on the rear-surface side and the liquid crystal panel 11 on the front-surface side. The optical members 16 include a diffuser plate, a diffuser sheet, a lens sheet and a brightness enhancement sheet arranged in this order from the rear-surface side. The optical members 16 has a function of converting light from the cold cathode tubes 18, which are linear light sources, to flat planar light.

The frame 17 has a frame-like overall shape along the outer edges of the liquid crystal panel 11 or the optical members 16. The frame 17 is arranged on the optical members 16 on the front-surface side. The edges of the optical members 16 are held between the frame 17 and the holders 19. A detailed structure of the frame 17 will be explained later.

The cold cathode tubes 18 are linear light sources (tubular light sources). They are mounted inside the chassis 14 with the axial direction thereof aligned with the long-side direction of the chassis 14. A plurality of the cold cathode tubes 18 are arranged with the axes thereof parallel to each other and a predetermined distance away from each other along the short-side direction (the Y-axis direction) of the chassis 14. Rubber holders 21 are fitted to the ends of the cold cathode tubes 18.

The holders 19 are made of synthetic resin in white that provides high light reflectivity. As illustrated in FIG. 2, each holder 19 extends along the short side of the chassis and has a box-like shape that opens on the rear-surface side. The holders 19 are mounted to the respective ends of the long sides of the chassis 14. The ends (non-light-emitting sections) of the cold cathode tubes 18 aligned and parallel to each other at each end are collectively covered by the corresponding holder 19. Each holder 19 has steps 19a on the front-surface side at an inner edge such that short-side edges of the optical members 16 are placed thereon, and thus the optical members 16 are held between the frame 17 and the holder 19.

Each lamp clip 20 is made of synthetic resin in white that provides high light reflectivity. The lamp clips 20 are arranged in a predetermined dispersed distribution on the inner surface of the bottom plate 14a of the chassis 14 (see FIG. 2). The lamp clips 20 are fixed to the bottom plate 14a of the chassis 14 and hold the middle sections (light-emitting sections) of the cold cathode tubes 18 excluding the end sections. The cold cathode tubes 18 are held a specific distance away from the bottom plate 14a of the chassis 14.

As illustrated in FIG. 2, the frame 17 included in the backlight unit 12 holds the liquid crystal panel 11 from the rear-surface side (the opposite side to the light exit side or the liquid crystal panel 11 side). The liquid panel 11 is held between the frame 17 and the bezel 13 located on the front-surface side. The bezel 13 is made of metal and formed in a frame-like shape so as to be arranged around a display area of the liquid crystal panel 11. It holds the edges of the liquid crystal panel 11 (non-display areas or frame areas) from the front-surface side. The frame 17 and the bezel 13 have mounting structures for the cabinets Ca and Cb and the chassis 14 similar to those of the chassis 14. The mounting structures of the bezel 13 are tabs 13a. Each tab 13a is provided at each end of the short side of the bezel 13 at the edge (each of the four corners) so as to extend outward along the X-axis direction (the long side direction). Each tab has a mounting hole that is a through hole in which the boss that protrudes from either one of the cabinets Ca and Cb are inserted. The bosses are not shown in the drawings. Next, the structure of the frame 17 and the mounting structures of the frame 17 will be explained.

Figure 4:
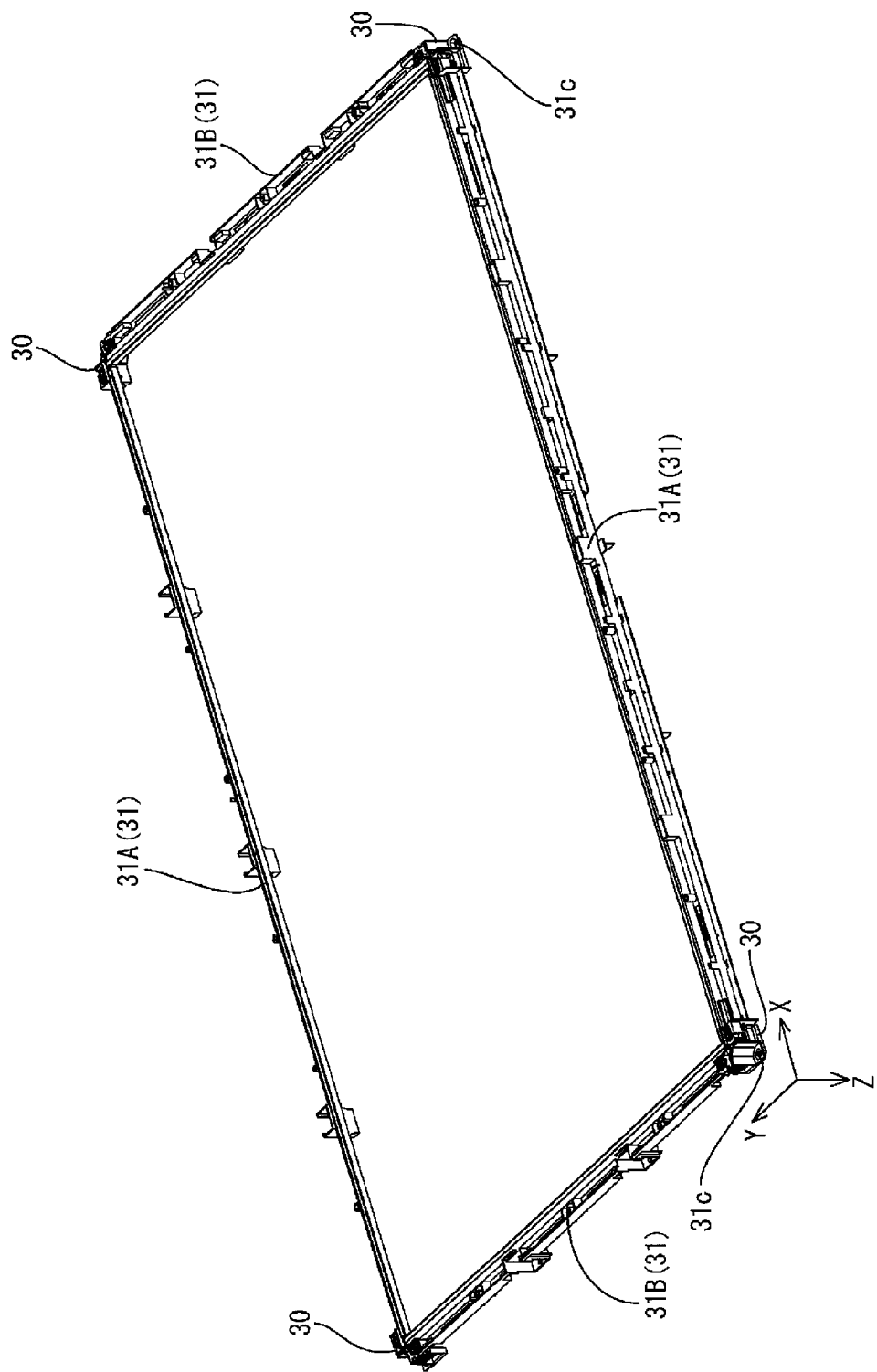
FIG. 4 is a perspective view of a frame.
Figure 5:
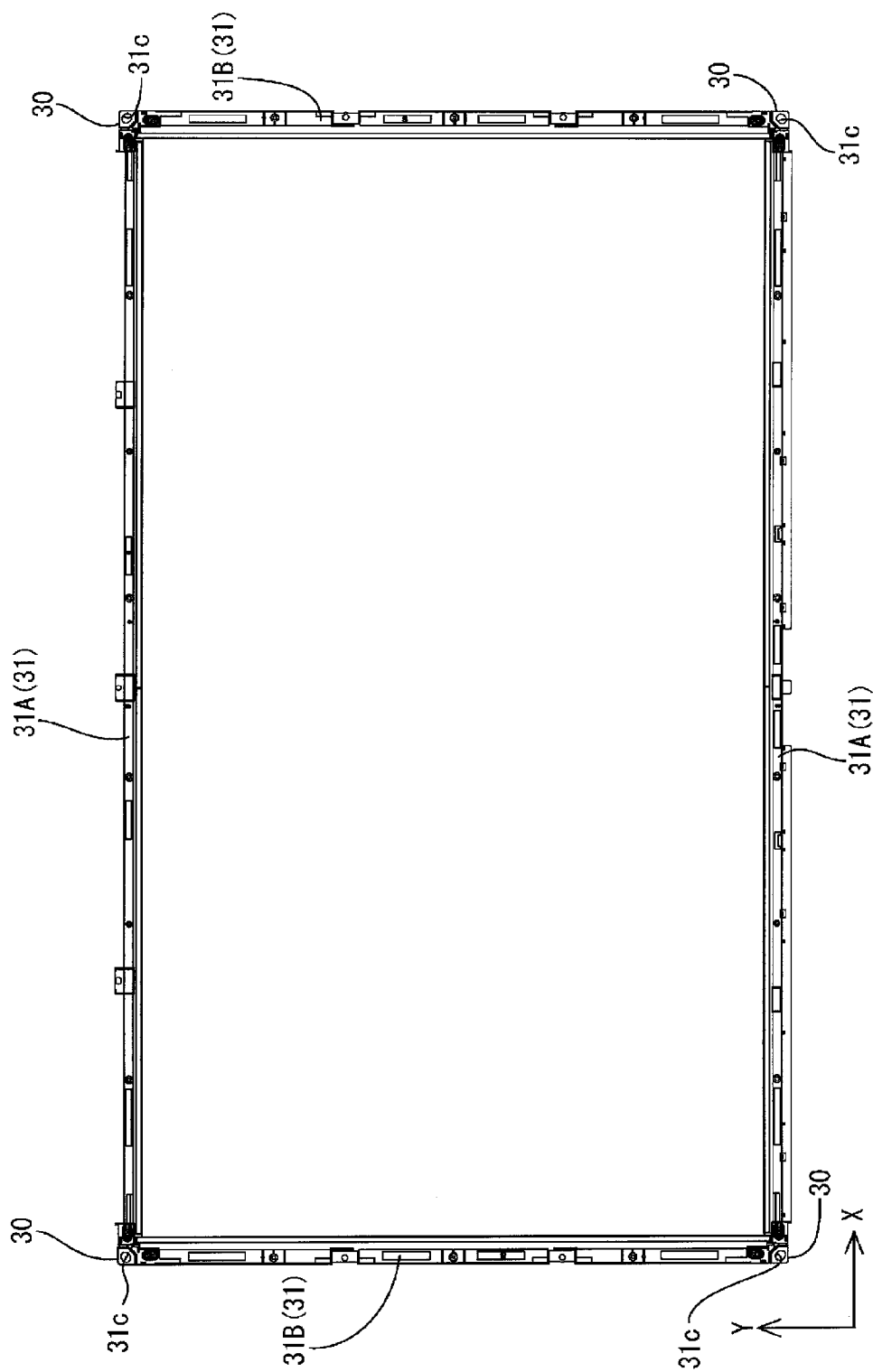
FIG. 5 is a plan view of the frame.

The frame 17 has block structures including a plurality of parts 30 and 31. The parts 30 and 31 are assembled into the frame 17. Joint portions between the parts 30 and 31 have displacement allowance structures. The displacement allowance structures are provided for compensating for thermal expansion or contraction. The frame 17 is made of synthetic resin. As illustrated in FIGS. 4 and 5, the frame 17 has a frame-like overall shape similar to the bezel 13 so as to surround the display area of the liquid crystal panel 11. The frame 17 is prepared by assembling four joint parts 30 and four elongated parts 31 together. Each joint part 30 forms one of four corners of the frame 17. The elongated parts 31 extend along the respective edges of the liquid crystal panel 11 and the optical members 16.

Figure 10:
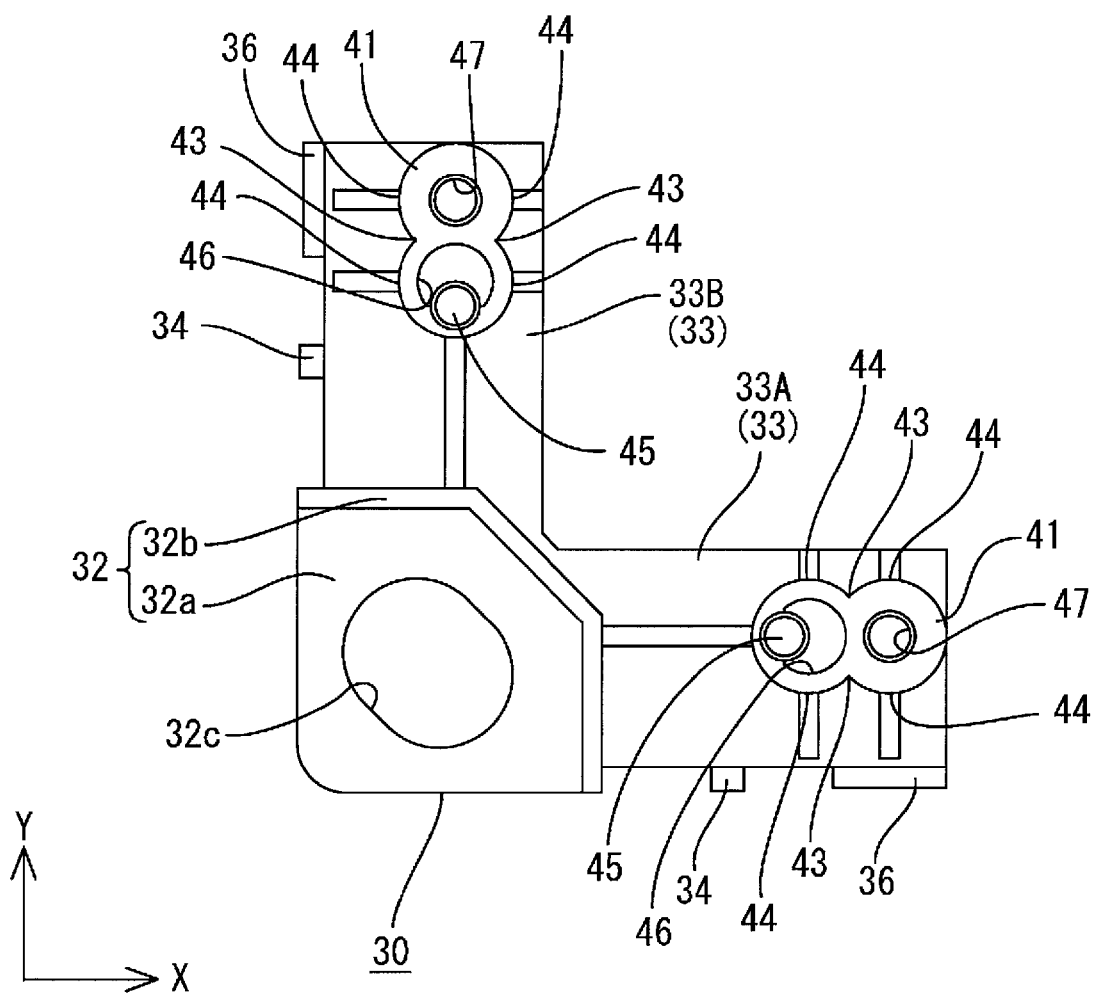
FIG. 10 is a plan view of a joint part.
Figure 11:
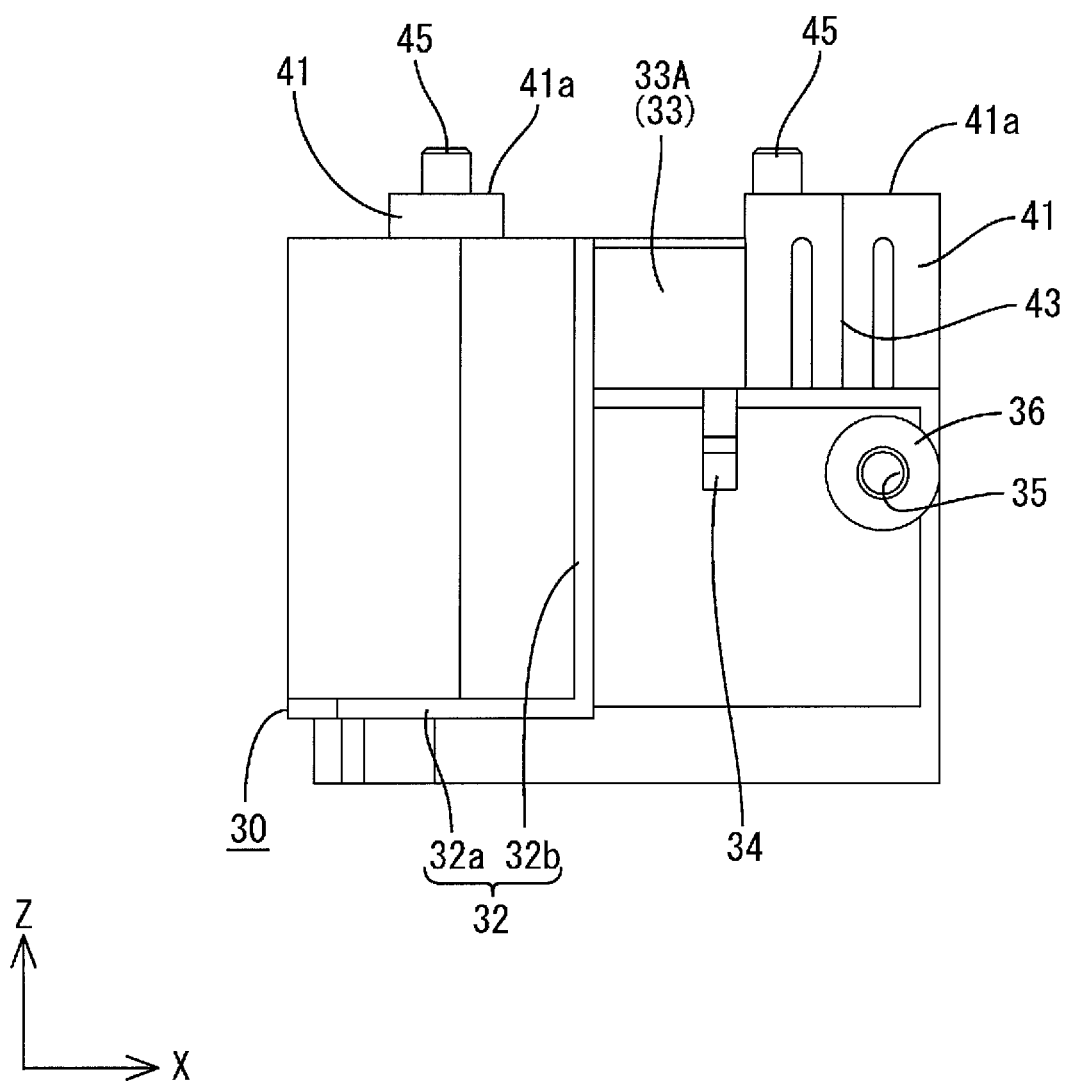
FIG. 11 is a side view of the joint part along the long side of the frame.
Figure 12:
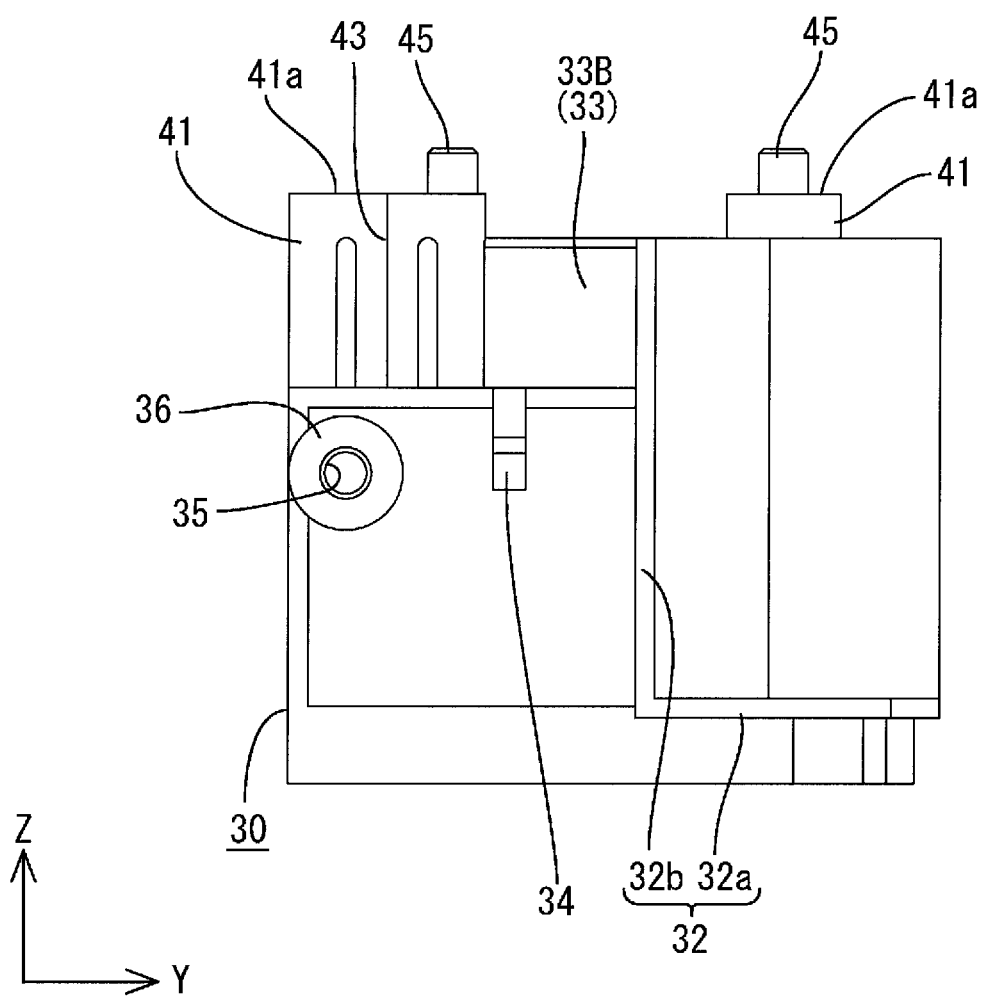
FIG. 12 is a side view of the joint part along the short side of the frame.

As illustrated in FIGS. 10 to 12, each joint part 30 has an L-shape overall shape in plan view. It includes a base portion 32 that forms a corner of the frame 17 and a pair of extending portions 33 that project from the base portion 32 in directions perpendicular to each other. The base portion 32 has a bottom wall 32a and a sidewall 32b. The bottom wall 32a is along the X-Y plane (parallel to the plate surfaces of the liquid crystal panel 11 and the optical members 16). The sidewall 32b rises from the bottom wall 32a along the Z-axis direction. The extending portions 33 continue from the sidewall 32b. The bottom wall 32a has a mounting hole 32 that is a through hole in which the boss of the cabinet Ca or Cb (not shown) is inserted.

The extending portion 33 includes a long-side extending portion 33A and a short-side extending portion 33B. The long-side extending portion 33A extends along the long side of the frame 17. The short-side extending portion 33B extends along the short side of the frame 17. In the following description, when the long-side extending portion and the short-side extending portion are separately explained, letters A and B are added to reference numbers 33 of the extending portion. When they are collectively explained, the letters are not added. Each extending portion 33 is connected to the corresponding elongated part 31. The front surface is stepped so as to be lower than the top of the sidewall 32b of the base portion 32. An end of the elongated part 31 is brought to the stepped-down front surface from the front-surface side along the Z-axis direction and the stepped-down front surface is capped by the end of the elongated part 31. A lock 34 that locks the elongated part 31 is provided on an outer side surface of each extending portion 33 as a lock structure. The lock 34 is in a block-like shape so as to project outward from the side surface of the extending portion 33 around the middle of a projection dimension. A surface of the lock 34 on the front-surface side is tapered so that locking is smoothly performed. Furthermore, a screw hole 35 is formed in the side surface of the extending portion 33 close to a distal end. The screw hole 35 is a fixing structure provided for fixing the bezel 13 in a condition that the bezel 13 is mounted. A seating 36 projects outward from the rim of the screw hole 35 so that the bezel 13 does not interfere with the lock structure (a lock tab 39) when the bezel 13 is fixed.

Next, the elongated parts 31 will be explained. As illustrated in FIG. 2, the elongated parts 31 include long-side elongated parts 31A and short-side elongated parts 31B. The long-side elongated parts 31A and the short-side elongated parts 31B extend along the long sides (the X-axis direction) and the short sides (the Y-axis direction) of the liquid crystal panel 11 and the optical members 16, respectively. The direction in which the long-side elongated parts 31A extend and the direction in which the short-side elongated parts 31B extend match the X-axis direction and the Y-axis direction, respectively. In the following description, when the long-side elongated parts and the short-side elongated parts are separately explained, letters A and B are added to reference numbers 31 of the elongated parts. When they are collectively explained, the letters are not added.

As illustrated in FIG. 3, each elongated part 31 includes a main portion 31a and a side portion 31b. The main portion 31a is parallel to the X-Y plane, that is, the plate surfaces of the liquid crystal panel 11 and the optical members 16. The side portion 31b is along the Z-axis direction, that is, parallel to a direction perpendicular to the plate surfaces of the liquid crystal panel 11 and the optical members 16. The elongated part 31 has a substantially L overall shape in cross section. The main portion 31a is a receiving portion that receives the edge of the liquid crystal panel 11 and also a holddown portion that holds the edges of the optical members 16.

As illustrated in FIGS. 4 and 5, ends of each elongated part 31 located at ends of extension are joint portions to which the joint parts 30 are connected. As illustrated in FIGS. 13 to 16, a side portion 31b is partially cut out so as to receive the extending portion 33 of the joint part 30. Moreover, an overlapping plate 38 that covers the front side of the extending portion 33 and overlaps the front side in plan view. A lock tab 39 that is a lock structure for the joint part 30 projects from an outer edge of the overlapping plate 38 to the rear-surface side along the Z-axis direction. The lock tab 39 has a cantilever shape. The lock tab 39 has a lock hole 39a around the middle of the width. The lock hole 39a opens to the front-surface side. The lock 34 is inserted in the lock hole 39a. When the lock 34 is hooked to the edge of the lock hole 39a, the elongated part 31 is locked (or held) to the joint part 30. A positioning portion 40 projects from the inner edge of the front surface of the overlapping plate 38. The positioning portion 40 is in contact with the edge of the liquid crystal panel 11. The positioning portion 40 extends along the extending direction of the elongated part 31 and a contact surface 40a that is in contact with the liquid crystal panel 11 extends in the same manner (see FIG. 3).

Figure 6:
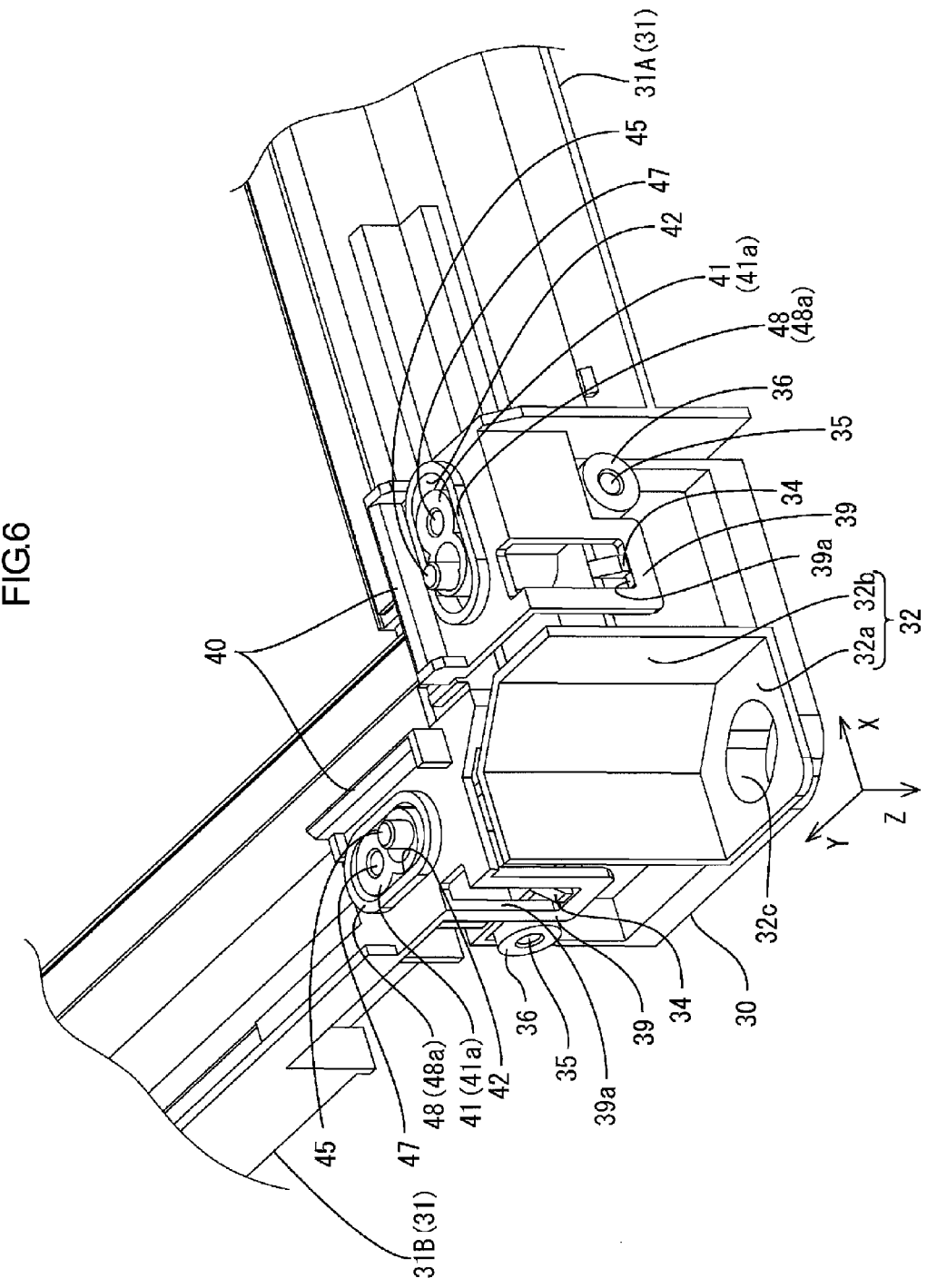
FIG. 6 is a magnified view of a corner of the frame.
Figure 7:
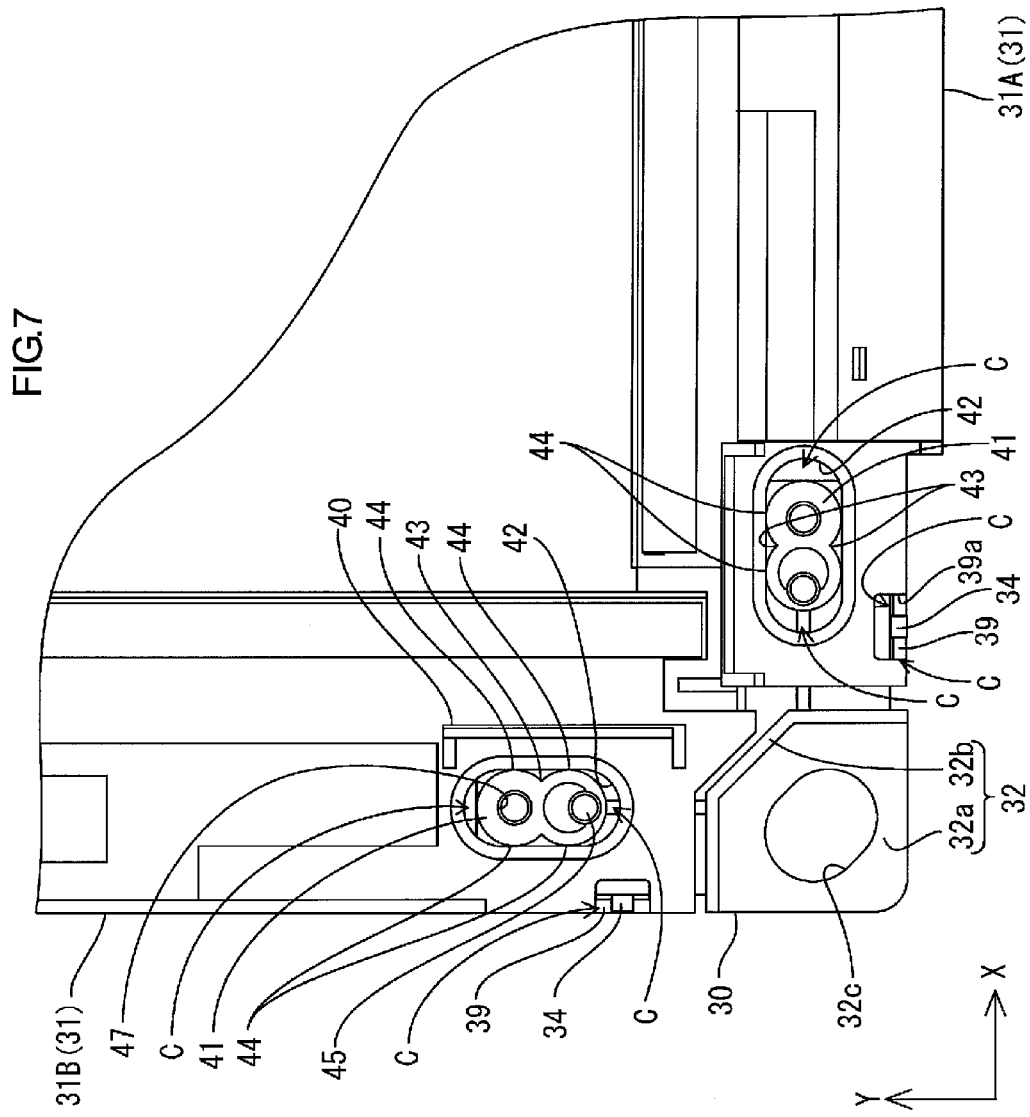
FIG. 7 is a magnified plan view of the corner of the frame.

Next, the displacement allowance structures provided in joint portions between the joint parts 30 and the elongated parts 31 will be explained in detail. As illustrated in FIGS. 6 and 7, the displacement allowance structures include first fixing portion 41 included in the joint parts 30 and second fixing portion 42 included in the elongated parts 31. Each first fixing portion 41 is a protrusion and each second fixing portion is a hole. The first fixing portion and the corresponding second fixing portion are fixed to each other with clearances C provided therebetween in the extending direction. A direction in which the first fixing portion 41 and the second fixing portion are fixed corresponds to the Z-axis direction, that is, a direction perpendicular to the plate surfaces of the liquid crystal panel 11 and the optical members 16, or a direction in which the elongated part 31 is mounted to the joint part 30.

As illustrated in FIGS. 10 to 12, each first fixing portion 41 projects from a front surface of the extending part 33 of the joint part 30 in an area where the end of the elongated part 31 overlaps the joint part 30. The first fixing portion 41 is provided at a distal end of each extending portion 33. Each first fixing portion 41 has a substantially oval shape in plan view with a long axis aligned with the extending direction of the extending portion 33, that is, the extending direction of the elongated part 31 that is placed over the joint part 30. Specifically, the long axis of the first fixing portion 41 of the long-side extending portion 33A is aligned with the X-axis direction and the long axis of the first fixing portion 41 of the short-side extending portion 33B is aligned with the Y-axis direction (see FIG. 10). The ends of the long dimension of the first fixing portion 41 are curved into an arc-like shape. Each side surface of the first fixing portion 41 along the long axis has a recess 43 so that a gap is provided between the side surface and the second fixing portion 42. The recess 43 is formed in an arc with a substantially equal curvature to that of the end of the long dimension of the first fixing portion 41. Namely, the first fixing portion 41 is formed as if two columns with the same diameter are bound together. Two parts of the outer side surfaces of the first fixing portion 41 along the long axis located at the front and the rear of the recess 43 are contact portions 44 that are in point contact with the second fixing portion 42 in plan view (see FIG. 7). The contact portions 44 are in line contact with the second fixing portion 42 in side view.

As illustrated in FIGS. 13 to 16, each second fixing portion 42 is a through hole that extends through an overlapping plate portion 38 in the Z-axis direction. The overlapping plate portion 38 is located in an overlapping area of the elongated part 31 in which the elongated part 31 overlaps the end of the joint part 30. The second fixing portion 42 is provided in the overlapping plate portion 38 in a location between the lock tab 39 and the positioning portion 40. An entire inner rim of the second fixing portion 42 is continuously formed in a closed-ring shape and in an oval shape in plan view. The long axis of the second fixing portion 42 is aligned with the extending direction of the elongated part 31. Specifically, the long axis of the second fixing portion 42 of the long-side elongated part 31A is aligned with the X-axis direction, that is, the extending direction of the long-side elongated part 31A (see FIGS. 13 and 14). The long axis of the second fixing portion 42 of the short-side elongated part 31B is aligned with the Y-axis direction, that is, the extending direction of the short-side elongated part 31B (see FIGS. 15 and 16). The ends of the long dimension of the second fixing portion 42 are formed in an arc shape similar to the first fixing portion 41.

The short dimension of each second fixing portion 42 is slightly larger than that of the first fixing portion 41 so as to receive the first fixing portion 41. The long dimension of the second fixing portion 42 is larger than that of the first fixing portion 41 by a predetermined dimension. When the first fixing portion 41 is inserted in the second fixing portion 42, as illustrated in FIGS. 6 and 7, the clearances C are provided between the fixing portions 41 and 42 in the extending direction of the elongated part 31 in which the second fixing portion is provided. The clearances C are provided in a size that corresponds to a difference in the long dimension between the first fixing portion 41 and the second fixing portion 42. A relative movement between the fixing portions 41 and 42 within the clearances is allowed. Namely, relative movement between the joint part 30 and the elongated part 31 along the extending direction is allowed. Specifically, the long-side elongated part 31A moves relative to the joint part 30 in the X-axis direction, and the short-side elongated part 31B moves relative to the joint part 30 in the Y-axis direction. By providing the clearances C between the ends of the first fixing portion 41 and the second fixing portion 42 as illustrated in FIGS. 6 and 7, the relative movement of the elongated part 31 is allowed even when the elongated part 31 thermally expands or contracts. The clearance C between the first fixing portion 41 and the second fixing portion 42 of the long-side elongated part 31A is larger than the clearance C between the first fixing portion 41 and the second fixing portion 42 of the short-side elongated part 31B. This is because a variation in size of the long-side elongated part 31A due to thermal expansion or contraction is larger than that of the short-side elongated part 31B.

The second fixing portion 42 is a through hole through which the elongated part 31 is passed. The first fixing portion 41 is inserted in the second fixing portion 42 and distal-end surfaces 41a thereof are uncovered on the front-surface side. The distal-end surfaces 41a of the first fixing portion 41 are opposite the inner surface of the bezel 13 mounted to the front surface of the frame 17 (see FIG. 3). A positioning pin 45 is provided on the distal-end surface 41a of each first fixing portion 41 as a positioning structure relative to the bezel 13. As illustrated in FIG. 10, the positioning pin 45 is formed in a circular column-like shape and located in a part of the first fixing portion 41 close to the base portion 32 in the long-axis direction. The bezel 13 has positioning holes 13c that are through holes in which the respective positioning pins 45 are inserted (see FIG. 3). The bezel 13 is positioned relative to the frame 17 in the X-axis direction and the Y-axis direction. The first fixing portion 41 has a void 46 that opens on the front-surface side in a location adjacent to the positioning pin 45.

As illustrated in FIG. 10, a screw hole 47 is provided in the distal-end surface 41a of the first fixing portion 41 as a fixing structure for the bezel 13. The screw hole 47 is formed in a circular shape in plan view and in a location close to the distal end of the extending portion 33 in the long-axis direction. The screw hole 47 is aligned with the insertion hole (not shown) of the bezel 13 and a screw passed through the insertion hole is inserted and tighten.

As illustrated in FIGS. 13 to 16, a supplementary support portion 48 projects from the inner edge of each second fixing portion 42 to the front-surface side along the Z-axis direction. The supplementary support portion 48 is in contact with the outer surface of the first fixing portion 41. A projecting direction of the supplementary support portion 48 matches the projecting direction of the first fixing portion 41 and the insertion direction of the first fixing portion 41 to the second fixing portion 42. The supplementary support portion 48 is an oval in plan view and formed in a short-drum-like shape that extends along the inner edge of the second fixing portion 42. Namely, the supplementary support portion 48 has a closed-ring shape. A support area of the second fixing portion 42 for the first fixing portion 41 along the insertion direction is expanded by a projecting dimension of the supplementary support portion 48. Namely, line contact areas between the first fixing portion 41 and the contact portions 44 are increased by the projecting dimension of the supplementary support portion 48. Therefore, the outer surface of the first fixing portion 41 is stably supported by the inner surfaces of the second fixing portion 42 and the supplementary support portion 48. A distal-end surface of the supplementary support portion 48 and the distal-end surfaces 41a of the first fixing portion 41 are substantially on the same plane (FIG. 6).

Figure 8:
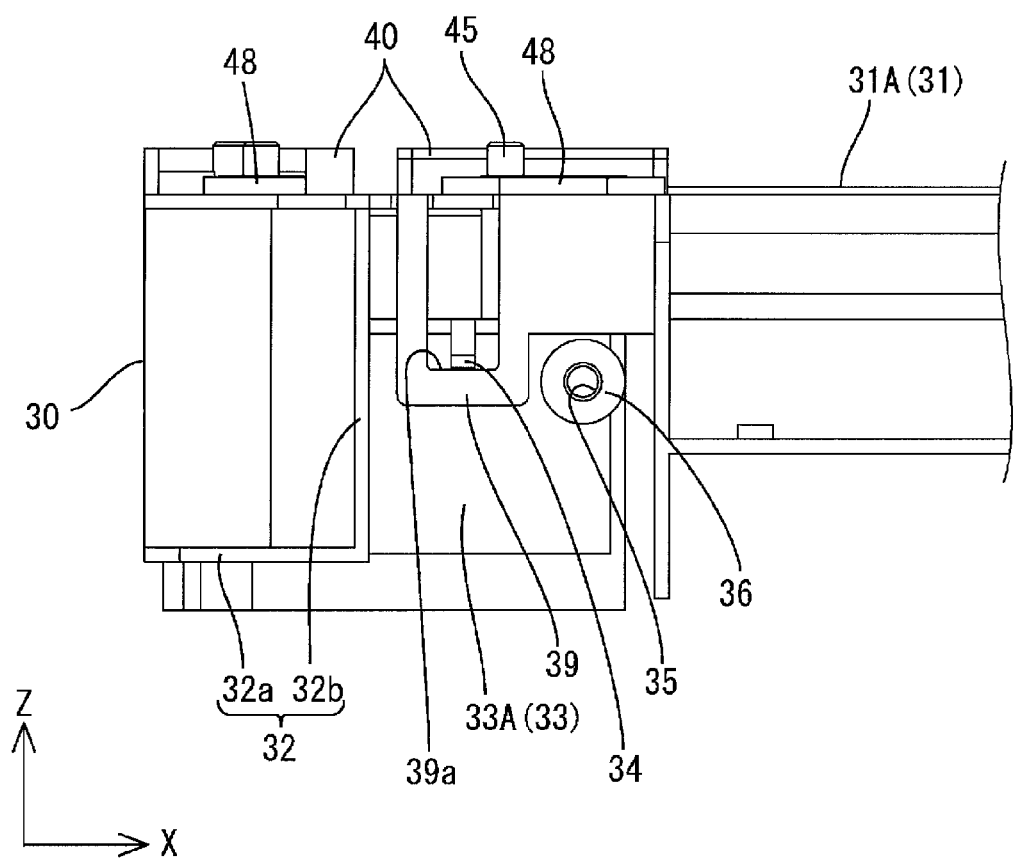
FIG. 8 is a magnified side view of the corner of the frame along a long side.
Figure 9:
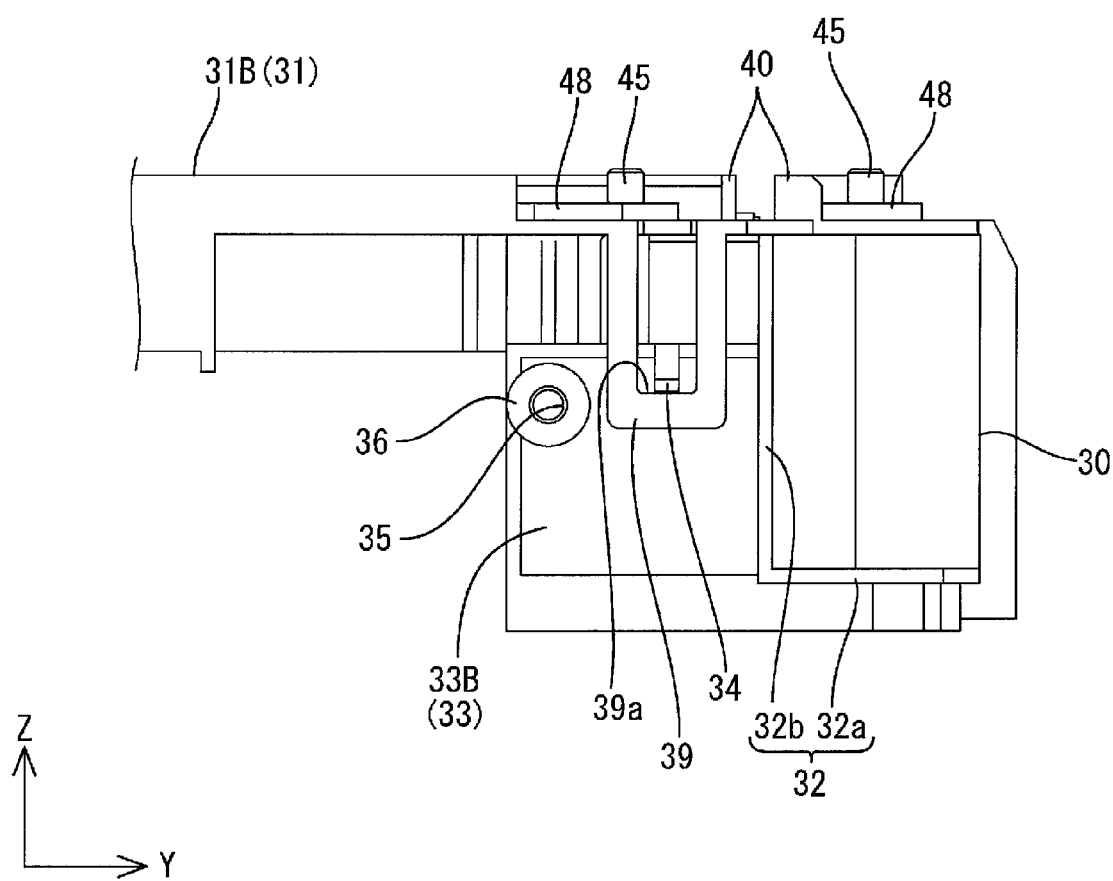
FIG. 9 is a magnified side view of the corner of the frame along a short side.

The first fixing portion 41 and the second fixing portion 42 allow the movement of the elongated part 31 relative to the joint part 30 in the extending direction and guide the relative movement. The lock structures of the joint part 30 and the elongated part 31 also have similar displacement allowance structures. As illustrated in FIGS. 8 and 9, the width of the lock hole 39a of the lock tab 39 of each elongated part 31, that is, a dimension of the lock hole 39a measuring in the extending direction is larger than the width of the lock 34 of the joint part 30 by the dimensions of clearances C. Each clearance C is substantially equal to the clearance C between the first fixing portion 41 and the second fixing portion 42. When the lock 34 is inserted in the lock hole 39a of the lock tab 39, the movement thereof in the extending direction of the elongated part 31 is allowed. Therefore, the movement of the elongated part 31 relative to the joint part 30 in the extending direction is allowed.

Figure 13:
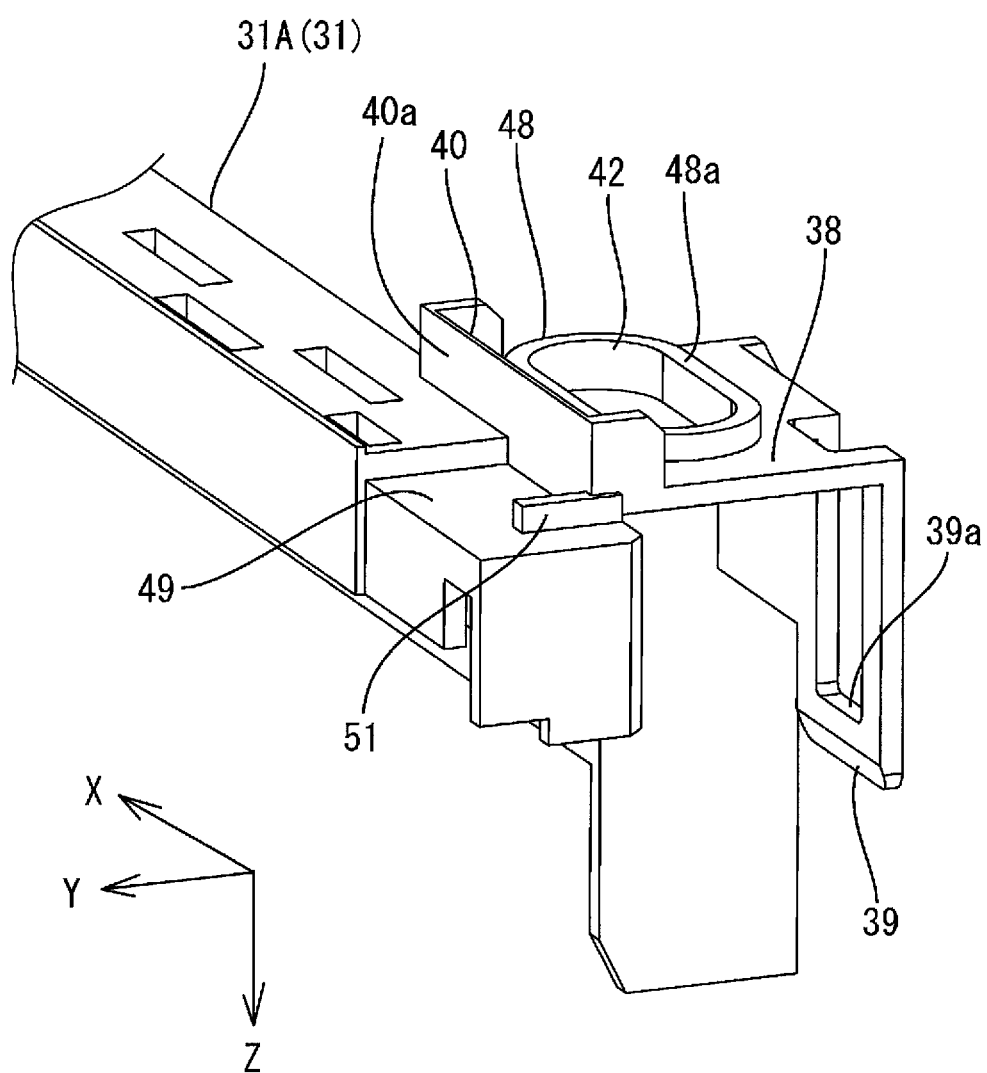
FIG. 13 is a magnified perspective view of an end of a long-side elongated part.
Figure 14:
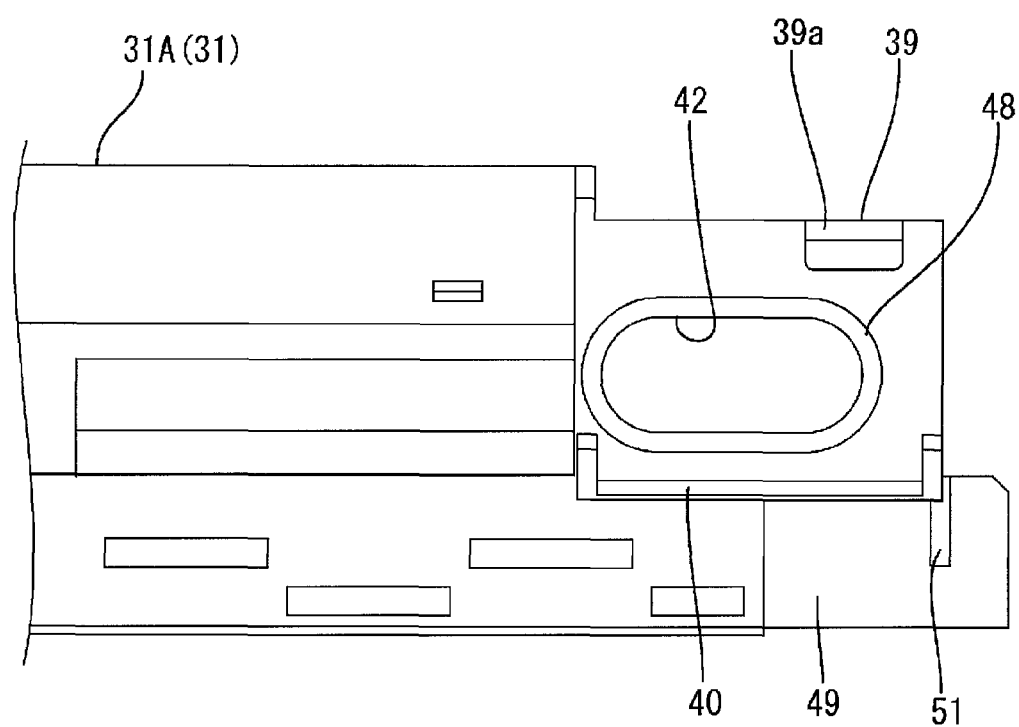
FIG. 14 is a magnified plan view of the end of the long-side elongated part.
Figure 15:
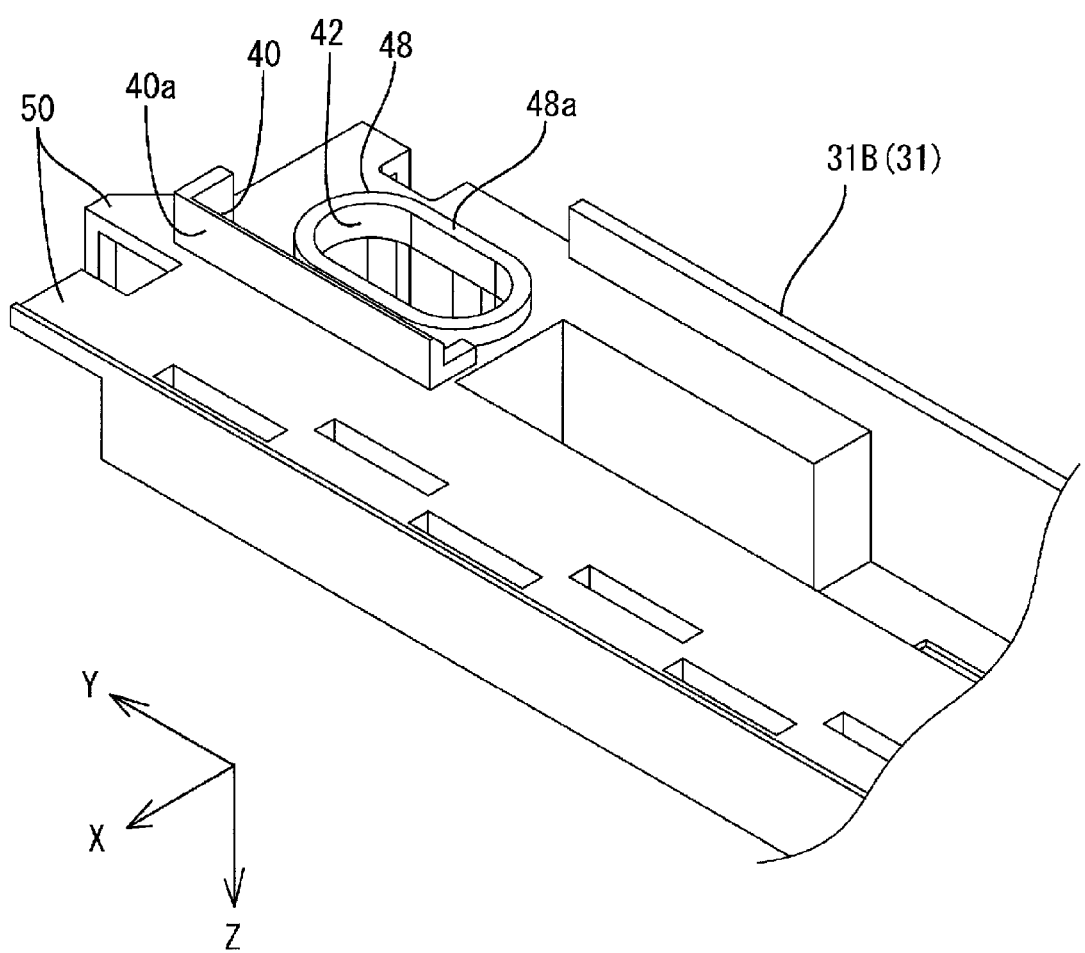
FIG. 15 is a magnified perspective view of an end of a short-side elongated.
Figure 16:
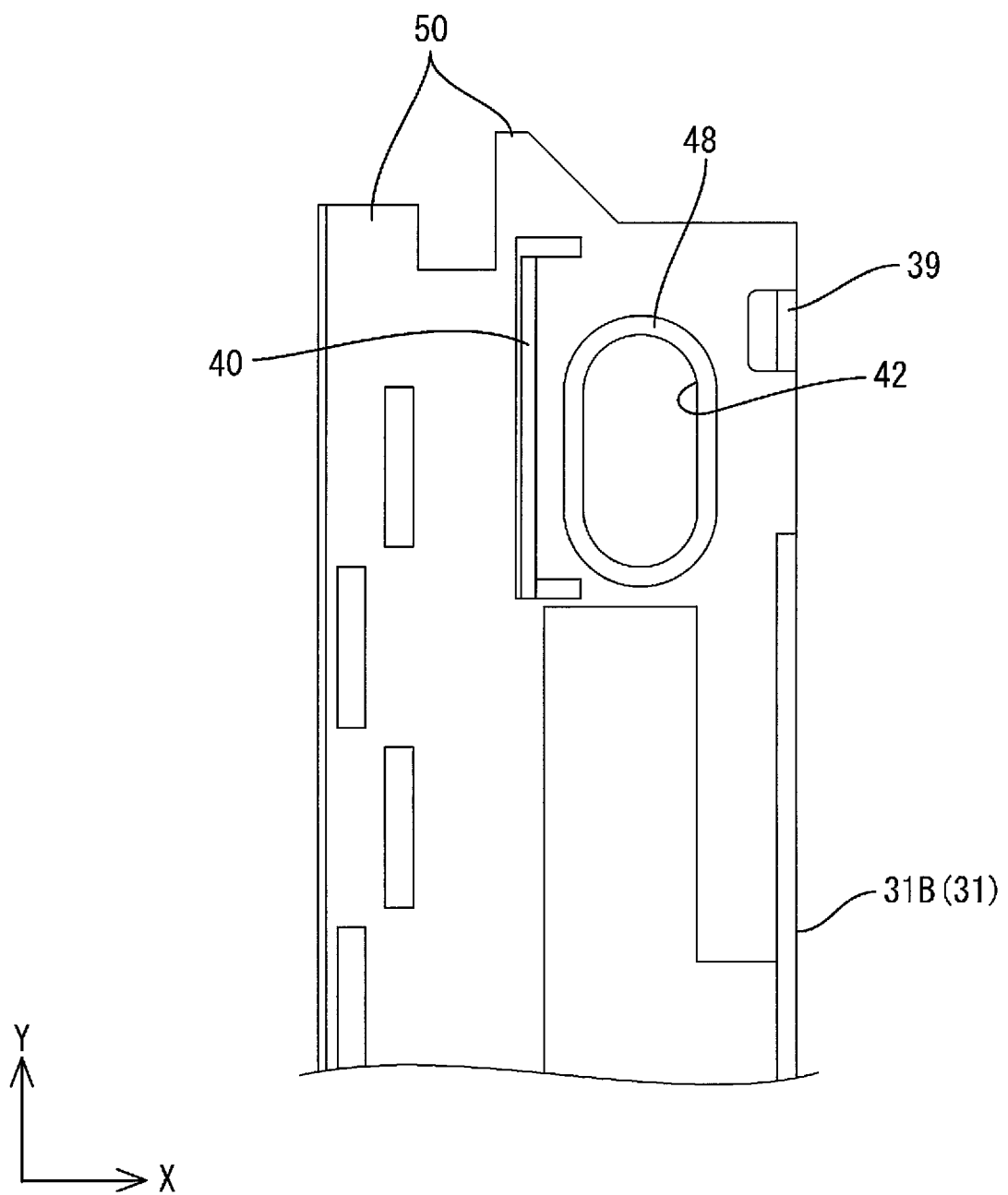
FIG. 16 is a magnified plan view of the end of the short-side elongated part.
Figure 17:
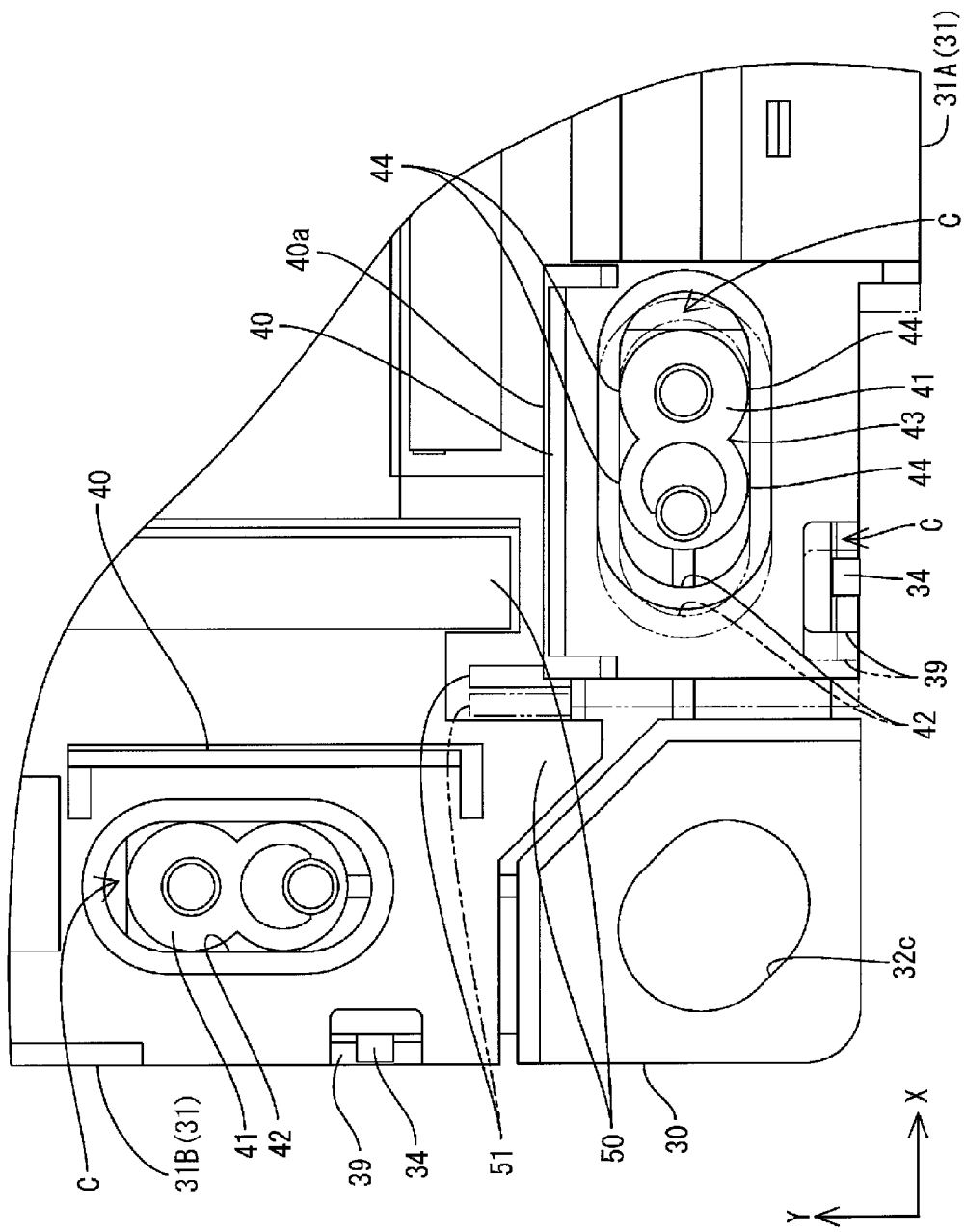
FIG. 17 is a magnified plan view of a corner of the frame in a condition that the long-side elongated part thermally expands.
Figure 18:
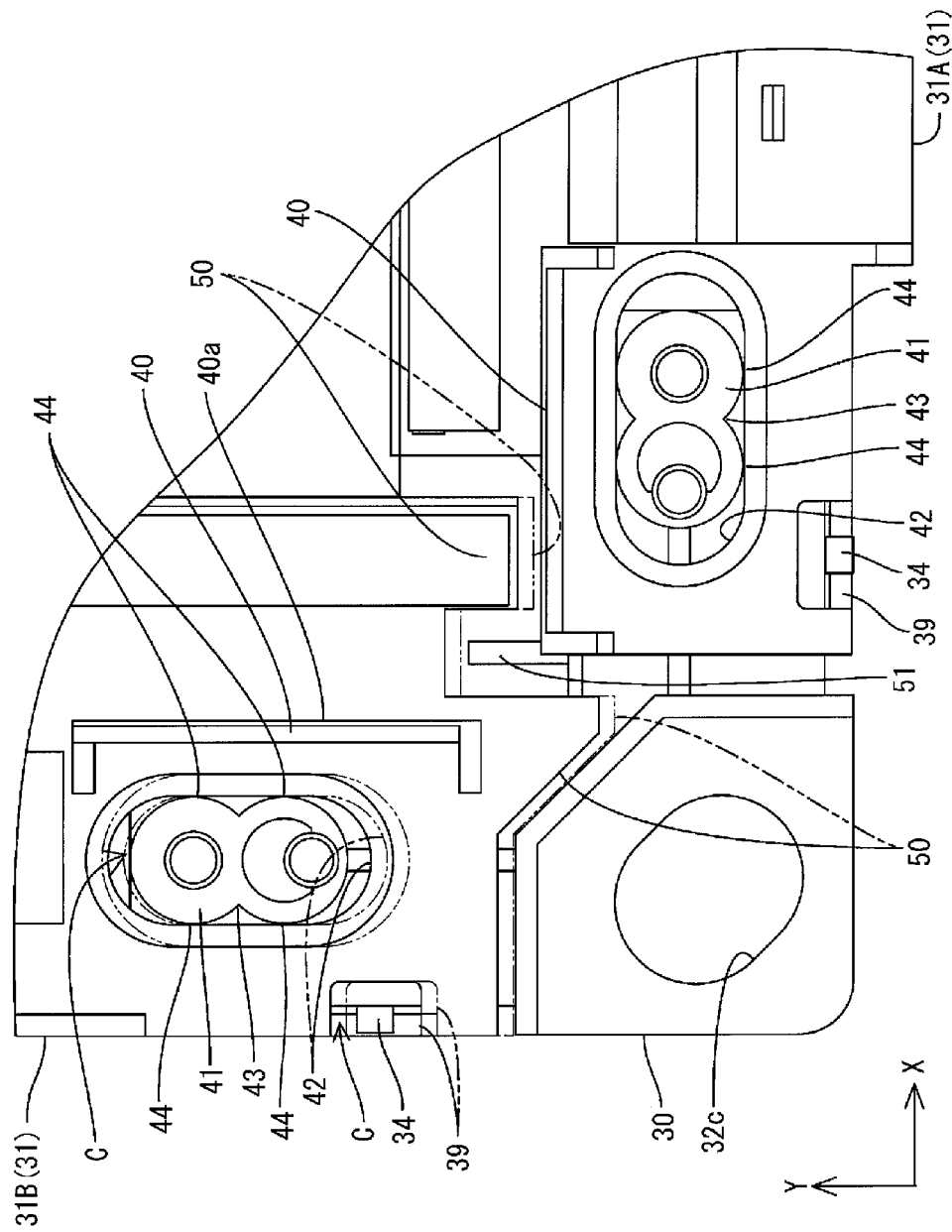
FIG. 18 is a magnified plan view of a corner of the frame in a condition that the short-side elongated part thermally expands.

When the joint parts 30 and the elongated parts 31 are assembled, as illustrated in FIG. 7, the long-side elongated parts 31A and the short-side elongated part 31B are connected to each other via the joint parts 30. The ends of each long-side elongated part 31A and the ends of each short-side elongated part 31B partially overlap each other in plan view. Predetermined clearances C are provided between the long-side elongated parts 31A and the short-side elongated parts 31B in the overlapping areas. Specifically, parts of each end of the long-side elongated part 31A and each end of the short-side elongated part 31B on an inner side than the overlapping plate portion 38. As illustrated in FIGS. 13 and 14, the inner area of the end of the long-side elongated part 31A than the overlapping plate portion 38 includes a step-down portion 49. As illustrated in FIGS. 15 and 16, the inner area of the end of the short-side elongated part 31B than the overlapping plate portion 38 includes a projection 50 that projects toward the long-side elongated part 31A side. The projection 50 is arranged on the front-surface side so as to overlap the step-down portion 49. As illustrated in FIG. 7, an elongated rib 51 is provided at the step-down portion 49 so as to extend along the extending direction of the short-side elongated part 31B. The protrusion 50 is formed in a fork-like shape so as to receive the rib 51. As illustrated in FIG. 7, clearances in similar size to those in the displacement allowance structures are provided between the step-down portion 49 (the rib 51) and the projection 50. The clearances allow the movement of the elongated part 31 relative to the joint part 30.

This embodiment has the above structures. Next, the functions of this embodiment will be explained. To assemble the frame 17, parts are set in specific jigs. Specifically, the long-side elongated part 31A is attached to the corresponding joint part 30 and then the short-side elongated part 31B is attached to the joint part 30. When the end of each elongated part 31 is attached to the corresponding extending portion 33 of the joint part 30 from the front-surface side along the Z-axis direction, the first fixing portion 41 is inserted in the corresponding second fixing portions 42. Moreover, the lock tab 39 goes over the lock 34 and thus elastically deforms outward temporarily. When the elongated part 31 is set in a defined position, the lock tab 39 passes the lock 34 and returns to the original shape with resilience. The lock 34 enters the lock hole 39a. The first fixing portion 41 is set in a specified position in the second fixing portion 42. The distal-end surface 41a and the distal-end surface 48a of the supplementary support portion 48 are substantially on the same plane (see FIGS. 6 to 9). Under this condition, the lock 34 is hocked to the edge of the lock hole 39a. Therefore, the movement of the elongated part 31 toward the opposite direction to the mounting direction thereof to the joint part 30, that is, the removing direction is restricted. The parts 30 and 31 are held in the condition that they are mounted. The second fixing portion 42 is a hole and the first fixing portion 41 that is inserted in the second fixing portion 42 projects on the front-surface side. Whether the distal-end surface 41a of the first fixing portion 41 and the distal-end surface 48a of the supplementary support portion 48 are at the same level can be visually confirmed. Namely, whether they are in a proper fixing condition or in an improper fixing condition is easily determined.

The frame 17 is assembled according to the above procedure, and the cold cathode tubes 18 and the optical members 16 are mounted to the chassis 14. When the frame 17 is mounted to the chassis 14, the lock structures (not shown) work. As a result, the frame 17 is held in the condition that it is mounted. In this condition, the mounting holes 32c of the frame 17 and the mounting holes 14c of the chassis 14 are aligned (see FIG. 2). Then, the liquid crystal panel 11 is placed over the frame 17 from the front-surface side, and the bezel 13 is mounted to the liquid crystal panel 11 from the front-surface side. The bezel 13 has the positioning holes 13c. By aligning the positioning holes 13c with the positioning pins 45 of the frame 17 and passing the positioning pins 45 through the positioning holes 13c, the bezel 13 is positioned relative to the frame 17 along the plate surface of the liquid crystal panel 11. In this condition, the screw holes (not shown) of the bezel 13 are aligned with the screw holes 35 and 47 of the frame 17. After the bezel 13 is positioned, the screws are inserted in the screw insertion holes and the screw holes 35 and 47 of the frame 17 and tighten. As a result, the bezel 13 is fixed to the frame 17 with the liquid crystal panel 11 sandwiched between the bezel 13 and the frame 17. The mounting holes 13b of the bezel 13 are aligned with the mounting holes 32c of the frame 17 and the mounting holes 14c of the chassis 14.

After the liquid crystal display device 10 is assembled, the cabinets Ca and Cb, which are exterior trim parts, are mounted to the liquid crystal display device 10. Each boss provided at either one of the cabinets Ca and Cb is inserted in all of the mounting holes 13b, 14c and 32c that are aligned. The cabinets Ca and Cb that sandwich the liquid crystal display device 10 therebetween are fixed together with the screws inserted in the bosses and tighten. They are also fixed to the liquid crystal display device 10. Because the mounting holes 13b, 14c and 32c are located at the corners of the liquid crystal display device 10, the liquid crystal display device 20 and the cabinets Ca and Cb are stably fixed.

In the liquid crystal display device 10 assembled according to the above procedure, the cold cathode tubes 18 inside the backlight unit 12 are turned on and off when the liquid crystal display device 10 is in use. An internal ambient temperature changes and thus thermal expansions and contractions occur in components of the liquid crystal display device 10. Among the components of the liquid crystal display device 10, the frame 17 is large and made of resin, a coefficient of thermal expansion of which is relatively larger than metals. Variations in size of the frame 17 due to thermal expansion and contraction is significantly larger in comparison to other components and thus various problems may occur. The frame 17 has the block structures and the parts 30 and 31 have the displacement allowance structures that allow the relative movement at the joint portions. Therefore, the thermal expansions and contractions can be compensated.

Specifically, each first fixing portion 41, which is a protrusion, of each joint part 30 is fixed in the second fixing portion 42, which is a hole, of each elongated part 31. Moreover, the clearances C are provided between the fixing portions 41 and 42 in the extending direction. The relative movement between the joint part 30 and the elongated part 31 in the extending direction are allowed within the clearances C. If the long-side elongated part 31A thermally expands from a state illustrated in FIG. 7, the end of the long-side elongated part 31A with the second fixing portion 42 is moved to the left in FIG. 17 along the X-axis direction relative to the first fixing portion 41 of the joint part 30, as illustrated with two-dot chain lines in FIG. 17. Namely, the expansion of the long-side elongated part 31A is allowed. If the thermal contraction occurs, the long-side elongated part 31A moves relative to the joint part 30 in the opposite direction. Namely, the contraction of the long-side elongated part 31A is allowed. If the short-side elongated part 31B thermally expands from a state illustrated in FIG. 7, the end of the short-side elongated part 31B with the second fixing portion 42 is moved to the bottom in FIG. 18 along the X-axis direction relative to the first fixing portion 41 of the joint part 30, as illustrated with two-dot chain lines in FIG. 17. Namely, the expansion of the short-side elongated part 31B is allowed. If the thermal contraction occurs, the short-side elongated part 31B moves relative to the joint part 30 in the opposite direction. Namely, the contraction of the short-side elongated part 31B is allowed.

During the relative movement, the first fixing portion 41 is in line contact with the second fixing portion in side view (in point contact in plan view), that is, the contact area is reduced and a frictional resistance is small. Therefore, stress applied to the fixing portions 41 and 42 is very small. The contact portions 44 of the first fixing portion 41 are away from each other in the extending direction and in contact with the second fixing portion 42. Therefore, the relative movement is stable. Furthermore, the surface of the first fixing portion 41 and the surface of the second fixing portion 42 along the extending direction rub against each other. Namely, the relative movement is smoothly guided. The lock structures of the joint part 30 and the elongated part 31 also include the displacement allowance structures. Therefore, the relative movement between the joint part 30 and the elongated part 31 are allowed while the joint part 30 and the elongated part 31 are maintained in a locked condition.

Even the elongated part 31 thermally expands or contracts, the joint part 30 does not move relative to the chassis 14 or the cabinets Ca and Cb to which the joint part 30 is fixed via the mounting hole 32c. Therefore, the relative position between the edge of the mounting hole 32c of the joint part 30 and the boss of the cabinet Ca or Cb, which are the mounting structures, does not change and stress is not applied. If the frame is prepared as a single part without the block structures and the edge of the mounting hole moves relative to the boss, an abnormal sound may be produced because they may rub against each other. Moreover, the thermal expansion of the frame is restricted by the boss and the frame may be deformed. Furthermore, and insertion condition of the boss in the mounting hole may change due to the rubbing. According to this embodiment, such problems are less likely to occur.

As described above, the liquid crystal display device 10 of this embodiment includes the liquid crystal panel 11, the optical members 16, the frame 17, the cabinets Ca and Cb, the mounting structures and the displacement allowance structures. The liquid crystal panel 11 is capable of light transmission. The frame 17 includes the elongated parts 31 and the joint parts 30. The elongated parts 31 extend along the outer edges of the liquid crystal panel 11 and the optical members 16. The joint parts 30 connect the elongated parts 31. The frame 17 has a frame shape and holds the edge portions of the liquid crystal panel 11 and the optical members 16. The frame 17 is mounted to the chassis 14 and the cabinets Ca and Cb. The mounting structures are provided in the joint parts 30 of the frame 17, the chassis 14 and the cabinets Ca and Cb for holding them together in the condition that they are mounted. The displacement allowance structures are provided in the connecting portions of the elongated parts 31 and the joint parts 30 for allowing the relative movements of the elongated parts 31 to the joint parts 30 along the extending directions.

Even when the elongated parts 31 thermally expand or contraction due to variations in the ambient temperature, the displacement allowance structures allow the relative movements of the elongated parts 31 to the joint parts 30 having the mounting structures. Therefore, stresses are less likely to be applied to the mounting structures when the elongated parts 31 thermally expand or contract. The stresses are less likely to be applied to the mounting structures when the frame 17 thermally expands or contracts. Therefore, problems due to the thermal expansion or contraction are less likely to occur.

The displacement allowance structures include the first fixing portions 41 of the joint parts 30 and the second fixing portions 42 of the elongated parts 31. Each first fixing portions 41 are fixed in the respective second fixing portions 42. The clearances C are provided between each first fixing portion 41 and the corresponding second fixing portion 42 in the extending direction. With this configuration, the relative movement of each elongated part 31 to the joint part 30 in the extending direction is allowed within the clearances C between the first fixing portion 41 and the second fixing portion 42.

Each fixing portion 41 is a protrusion and each second fixing portion 42 is a hole for receiving the first fixing portion 41. The first fixing portion 41 that is a protrusion and the second fixing portion that is a hole are fixed to each other, and they form the displacement allowance structure.

Each second fixing portion 42 is a through hole that extends through the elongated part 31. With this configuration, the fixing condition in which the first fixing portion 41 is fixed in the second fixing portion 42 can be visually confirmed.

The bezel 13 is arranged on the opposite side of the liquid crystal panel 11 with respect to the frame 17. The liquid crystal panel 11 is sandwiched between the frame 17 and the bezel 13. Each first fixing portion 41 fixed in the second fixing portion 42 is opposite the bezel 13. Each first fixing portion 41 has the positioning structure for positioning the bezel 13 along the plate surface of the liquid crystal panel 11. Because the positioning structures are provided in the first fixing portions 41, spaces and sizes can be preferably reduced. The joint parts 30 include the positioning structures. Therefore, when the elongated parts 31 move relative to the joint parts 30 due to the thermal expansions or contractions, stresses are less likely to be applied to the positioning structures.

The bezel 13 is arranged on the opposite side of the liquid crystal panel 11 with respect to the frame 17. The liquid crystal panel 11 is sandwiched between the frame 17 and the bezel 13. Each first fixing portion 41 fixed in the second fixing portion 42 is opposite the bezel 13. Each first fixing portion 41 has the fixing structure for fixing the bezel 13 in the condition that it is mounted. The fixing structures are provided using the first fixing portions 41. Therefore, the spaces and the sizes can be preferably reduced. The joint parts 30 include the fixing structures. Therefore, when the elongated parts 31 move relative to the joint parts 30 due to the thermal expansions or contractions, stresses are less likely to be applied to the fixing structures.

Each second fixing portion 42 has the supplementary support portion 48. The supplementary support portion 48 projects from the inner edge portion of the second fixing portion 42 in the direction perpendicular to the plate surface of the liquid crystal panel 11 and the optical members 16. The inner surface of the supplementary support portion 48 is in contact with the outer surface of the first fixing portion 41. The outer surface of the first fixing portion 41 is in contact not only with the inner surface of the second fixing portion 42 but also with the inner surface of the supplementary support portion 48. Therefore, each elongated part 31 stably moves relative to the joint part 30 in the extending direction when the relative movement occurs. Furthermore, each first fixing portion 41 is stably fixed in the second fixing portion 42.

Each supplementary support portion 48 is formed such that the distal-end surface 48a thereof and the distal-end surface of the first fixing portion 41 are substantially on the same plane. The distal-end surface 41a of the first fixing portion 41 and the distal-end surface 48a of the supplementary support portion 48 can be viewed. Therefore, the fixing condition in which the first fixing portion 41 is fixed in the second fixing portion 42 can be easily confirmed. For instance, if the first fixing portion 41 is not properly fixed in the second fixing portion 42, the distal-end surface 41a of the first fixing portion 41 and the distal-end surface 48a of the supplementary support portion 48 are at different levels. Therefore, the improper fixing condition is easily detected through a visual inspection.

The direction in which the first fixing portion 41 is fixed in the second fixing portion 42 corresponds to the direction that crosses the plate surfaces of the liquid crystal panel 11 and the optical members 16. One of the first fixing portion 41 and the second fixing portion 42, whichever is a hole, has the closed-ring inner edge. The first fixing portion 41 or the second fixing portion 42, whichever is a hole, has an inner edge that continues entirely around and is less likely to be deformed. Therefore, the relative movement of the other one in the extending direction can be stabilized.

The surfaces of each first fixing portion 41 and the corresponding second fixing portion 42 along the extending direction rub against each other. Therefore, the relative movement between the first fixing portion 41 and the second fixing portion 42 are smoothly guided.

The direction in which the first fixing portion 41 is fixed in the second fixing portion 42 corresponds to the direction that crosses the plate surfaces of the liquid crystal panel 11 and the optical members 16. Each joint part 30 and each elongated part 31 have the lock structures for restricting the relative movements thereof in the opposite direction to the fixing direction. The lock structures include the displacement allowance structures. Therefore, the joint part 30 and the elongated part 31 remain in the locked condition while the relative movement of the elongated part 31 to the joint part 30 in the extending direction is allowed.

Each first fixing part 41, which is a protrusion, among the first fixing parts 41 and the second fixing parts 42 has recesses 43 in the surfaces along the extending direction. Each recess 43 is formed such that a gap is provided between the first fixing portion 41 and the second fixing portion 42 in which the first fixing portion 41 is fixed. Therefore, the first fixing portion 41 is in line contact with the second fixing portion 42 at multiple positions in the extending direction. With the recesses 43, the gaps are created and thus the contact areas between the first fixing portion 41 and the second fixing portion 42 can be reduced. Therefore, the frictional resistance during the relative movement in the extending direction can be reduced. The first fixing portion 41 is in line contact with the second fixing portion at multiple positions in the extending direction. Therefore, the relative movement in the extending direction is stable.

The joint parts 30 form the corners of the frame 17 and the mounting structures are provided at the corners. Because the mounting structures are provided at the corners of the frame 17, the frame 17 is stably mounted to the chassis 14 and the cabinets Ca and Cb.

The displacement allowance structures are provided at the end portions of the joint parts 30 and the elongated parts 31. In comparison to joint parts and elongated parts having displacement allowance structures around central areas, sizes of the joint parts 30 or the elongated parts 31 can be reduced.

The frame 17 is made of resin. In comparison to a metal frame, cost and weight of the frame 17 can be reduced. In general, resin has a higher coefficient of thermal expansion than metal. However, the thermal expansions and contractions of the elongated parts 31 are preferably compensated by the displacement allowance structures.

Each elongated part 31 includes the positioning portions 40 for positioning the liquid crystal panel 11 relative to the direction along the plate surface thereof. The contact surface 40a of each positioning portion 40, which is in contact with the edge of the liquid crystal panel 11 is along the extending direction. When the elongated part 31 moves relative to the joint part 30 in the extending direction, the position of the contact surface 40a of the positioning portion 40 relative to the edge of the liquid crystal panel 11 in the direction perpendicular to the extending direction rarely changes. The positioning portion 40 maintains the liquid crystal panel 11 at the proper position.

The cabinets Ca and Cb are exterior trim parts that cover the liquid crystal panel 11 and the frame 17 from the outside. Stresses are less likely to be applied to the mounting structures for mounting the exterior trim parts.

<Second Embodiment>

Figure 19:
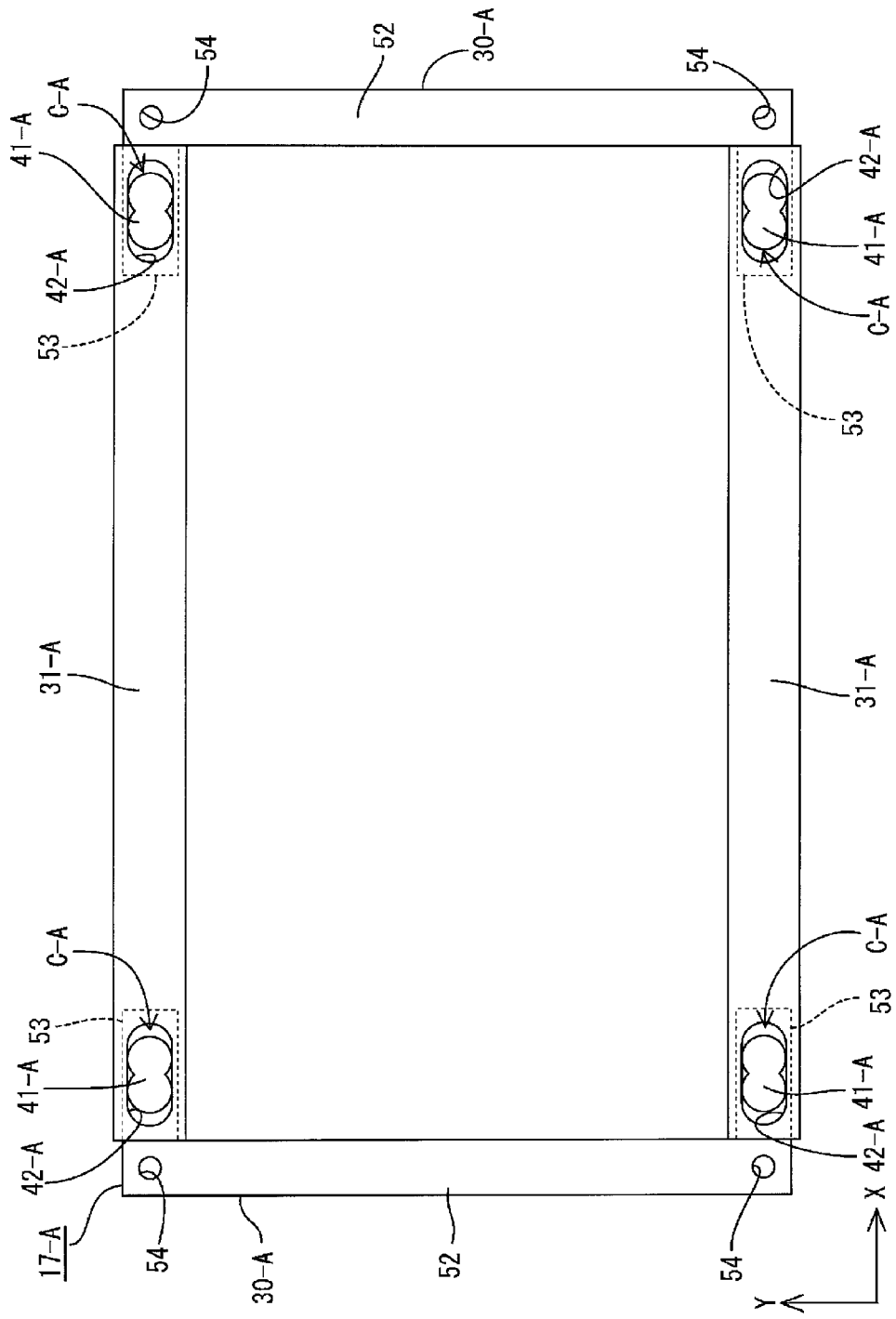
FIG. 19 is a plan view of a frame according to the second embodiment of the present invention.

The second embodiment of the present invention will be explained with reference to FIG. 19. In this embodiment, different shapes of joint parts 30-A are used. Similar parts of this embodiment to those of the first embodiment will be indicated by the same symbols followed by -A. The same structures, functions and effects will not be explained.

Each joint part 30-A of this embodiment has a configuration in which the joint part 30 and the short-side elongated part 31B of the first embodiment are integrated. Specifically, the joint part 30-A includes an elongated portion 52 and a pair of extending portions 53. The elongated portion 52 extends along a short-side edge (the Y-axis direction) among edges of a liquid crystal panel and optical members. Each extending portion 53 extends from either end of the elongated portion 52 along a long side (the X-axis direction) of the liquid crystal panel and the optical members. The elongated portion 52 has mounting holes 54 at ends of a extending dimension thereof (extending in the Y-axis direction), that is, at corners of a frame 17-A. The mounting holes 54 are provided as mounting structures for mounting the frame 17-A to a chassis and cabinets. Elongated parts 31-A are mounted to the extending portions 53 from the front-surface side so as to cover the extending portions 53. The elongated parts 31-A extend along long edges among the edges of the liquid crystal panel and the optical members (the X-axis direction). Each extending portion 53 has the first fixing portion 41-A that is fixed in the second fixing portion 42-A of the elongated part 31-A. Clearances C-A are provided between the fixing portions 41-A and 42-A in the long-side direction of the liquid crystal panel and the optical members. Therefore, a movement of the elongated part 31-A relative to the joint part 30-A in an extending direction in which the elongated part 31-A extends (the X-axis direction) is allowed. Namely, the relative movement in the long-side direction of the liquid crystal panel and the optical members is allowed.

In the frame 17-A having a landscape rectangular overall shape, an absolute value of the amount of thermal expansion or contraction tends to be large on the long side than on the short side. In a middle-size liquid crystal display device, thermal expansion and contraction on a short side do not matter as much. According to this embodiment, only thermal expansion and contraction on the long side are compensated. This provides necessary and sufficient solutions for the middle-size liquid crystal display device. The frame 17-A of this embodiment includes four parts that are a pair of the joint parts 30-A and a pair of the elongated parts 31-A. In comparison to the first embodiment, the number of parts of the frame 17-A and the number of assembly steps are reduced. This contributes to cost reduction.

<Third Embodiment>

Figure 20:
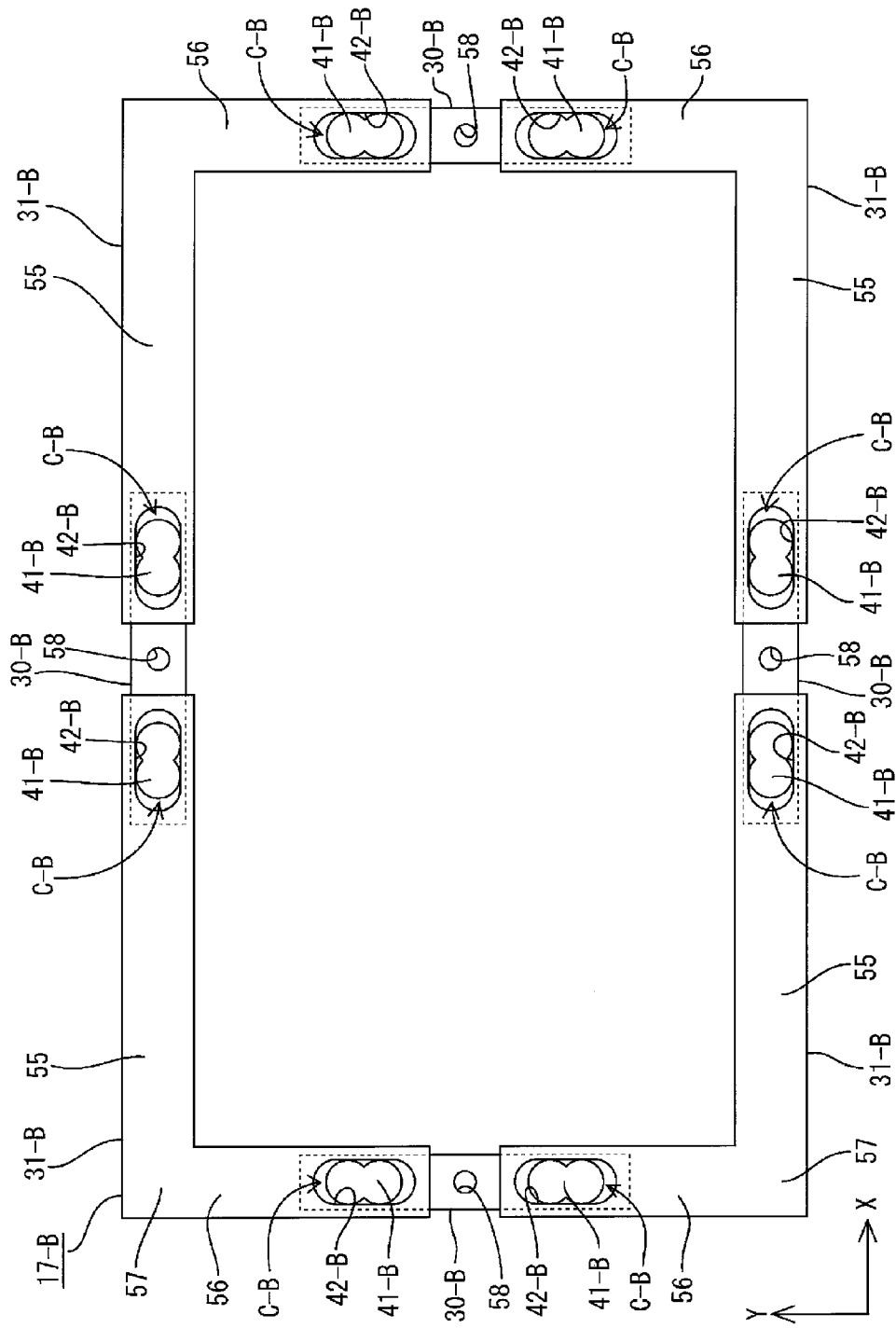
FIG. 20 is a plan view of a frame according to the third embodiment of the present invention.

The third embodiment of the present invention will be explained with reference to FIG. 20. In this embodiment, joint parts 30-B that do not form corners of a frame 17-B are used. Similar parts of this embodiment to those of the first embodiment will be indicated by the same symbols followed by -B. The same structures, functions and effects will not be explained.

The frame 17-B of this embodiment includes four elongated parts 31-B including portions that form corners of the frame 17-B and four joint parts 30-B that connect the elongated parts together. Each elongated part has a substantially L shape in plan view. It has a long-side extending portion 55 and a short-side extending portion 56, ends of which are connected to each other. The long-side extending portion 55 extends along a long-side edge of the liquid crystal panel and the optical members (the X-axis direction). The short-side extending portion 56 extends along a short-side edge of the liquid crystal panel and the optical members (the Y-axis direction). A joint portion 57 forms one of the corners of the frame 17-B. Second fixing portions 42-B are provided in end portions of the elongated part away from the joint portion 57. Each joint part 30-B is arranged around the middle of the long side (the X axis) or the short side (the Y axis) so as to extend substantially straight along the long side or the short side. The joint part 30-B has first fixing portions 41-B at ends thereof in an extending direction in which it extends. The first fixing portions 41-B are fixed in the respective second fixing portions of the elongated part 31-B. Clearances C-B are provided between the fixing portions 41-B and 42-B in the extending direction of the elongated part 31-B. Therefore, relative movements of the elongated part 31-B to the joint part 30-B in the X-axis direction and the Y-axis direction are allowed. Each joint part 30-B has a mounting hole 58 around the middle in the extending direction. The mounting hole 58 is provided as a mounting structure for mounting the frame 17-B to the chassis and the cabinets. Namely, the frame 17-B is fixed to the chassis and the cabinets at the middle position of each side but not at the corners and held in the condition that it is mounted.

<Fourth Embodiment>

The fourth embodiment of the present invention will be explained with reference to FIG. 21. In this embodiment, a relationship between a height of projection of supplementary support portions 48-C and that of first fixing portions 41-C is different. Similar parts of this embodiment to those of the first embodiment will be indicated by the same symbols followed by -C. The same structures, functions and effects will not be explained.

Figure 21:
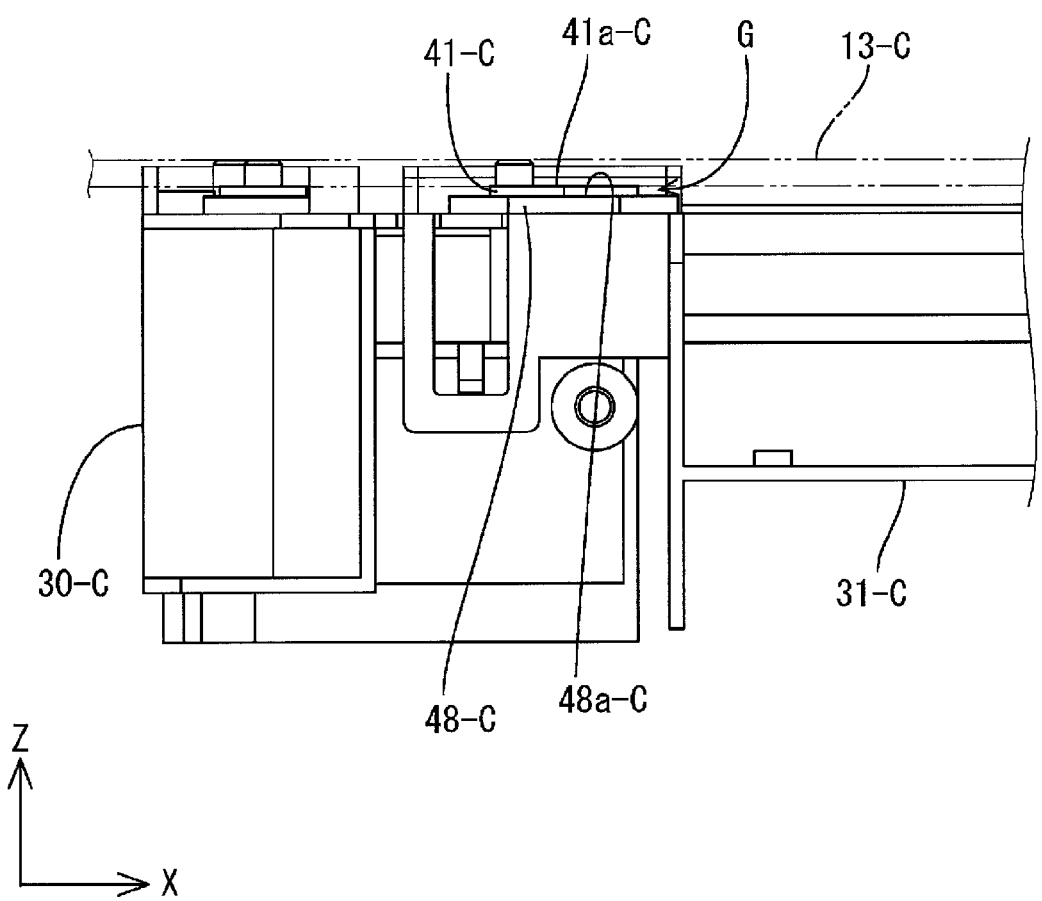
FIG. 21 is a magnified side view of a corner of a frame along a long side according to the fourth embodiment of the present invention.

As illustrated in FIG. 21, each supplementary support portion 48-C is formed such that a distal-end surface 48a-C is located lower than a distal-end surface 41a-C of the first fixing portion 41-C. Conversely, the distal-end surface 41a-C is located higher than the distal-end surface 48a-C of the supplementary support portion 48-C. Namely, a specified gap G in height is created between the distal-end surface 48a-C of the supplementary support portion 48-C and the distal-end surface 41a-C of the first fixing portion 41-C. The distal-end surface 41a-C of the first fixing portion 41-C located relatively higher is in contact with a rear surface of a bezel 13-C illustrated by two-dot chain lines in FIG. 21. The distal-end surface 48a-C of the supplementary support portion 48-C located relatively lower is not in contact with the rear surface of the bezel 13-C, that is, in a non-contact state, and a gap G is provided therebetween. When the elongated part 31-C having the supplementary support portion 48-C moves relative to the joint part 30-C in the extending direction, frictional resistance is not produced between the supplementary support portion 48-C and the bezel 13-C. Furthermore, the bezel 13-C is fixed to the joint parts 30-C with screws (not shown) but fastening powers of the screws are least likely to affect the elongated parts 31-C. Therefore, the elongated parts 31-C smoothly move relative to the joint parts 30C.

<Other Embodiments>

The present invention is not limited to the above embodiments explained in the above description. The following embodiments may be included in the technical scope of the present invention, for example.

(1) In the above embodiments, the frame has the block structures and the displacement allowance structures. However, the bezel may have the block structures and the displacement allowance structures. Especially when the bezel is made of resin having a high coefficient of thermal expansion, these structures exert preferable effects. Furthermore, either one of the frame and the bezel may have these structures or both of them may have these structures.

(2) Other than the above embodiment (1), if the a holding fixture having a frame-like shape is arranged inside the chassis of the backlight unit so as to support the optical members from the rear-surface side, the holding fixture may have the block structures and the displacement allowance structures. Especially when the bezel is made of resin having a high coefficient of thermal expansion, these structures exert preferable effects. Furthermore, any one or two of the frame, the bezel and the holding fixture may have these structures or all of them may have these structures.

(3) In the above embodiments, the second fixing portions are holes. However, the second fixing portions may be recesses that do not extend all the way through the elongated parts.

(4) In the above embodiments, the first fixing portions that are protrusions are provided on the joint parts and the second fixing portions that are holes (or recesses) in the elongated parts. However, the first fixing portions may be provided as holes (or recesses) and the second fixing portions may be provides as protrusions.

(5) In the above embodiments, the mounting holes are provided in the joint parts as mounting structures. However, protrusions such as bosses may be provided on the joint parts and mounting holes may be provided in the cabinets. Moreover, protrusions such as bosses may be provided on the chassis and mounting holes may be provided in the joint parts and the cabinets.

(6) In the above embodiments, the joint parts have the screw holes provided as the fixing structures for fixing the frame to the bezel. However, protrusions such as bosses may be provided on the join parts as fixing structures and insertion holes, through which the protrusions are passed, in the bezel. Moreover, any one of the screw hole in each first fixing portion (the fixing structure for fixing it to the bezel) and the screw hole in each extending portion may not be required.

(7) In the above embodiments, the positioning pin is provided on each joint part as the positioning structure for positioning the frame to the bezel. However, a positioning recess or a positioning hole may be provided in each joint part as the positioning structure, or such a positioning structure may not be included.

(8) In the above embodiments, each first fixing portion has the recess in the outer surface thereof along the long-axis direction and a pair of the contact portions that are in contact with the second fixing portion. However, each first fixing portion may have more than one recesses and more than two contact portions. The first fixing portion may not have a recess and be in surface contact with the second fixing portion.

(9) In the above embodiments, each supplementary support portion is formed along an entire periphery of the inner edge of second fixing portion. However, a part of the supplementary support portion may be cut out such that the supplementary support portion have an open-end ring shape in plan view.

(10) In the above embodiments, the supplementary support portions are provided. However, the supplementary support portion may not be required.

(11) In the above embodiments, each second fixing portion is formed in a closed-end ring shape. However, the second fixing portion may be formed in an open-end ring shape.

(12) In the above embodiments, the surfaces of each first fixing portion and the surfaces of the corresponding second fixing portion along the extending direction rub against each other. However, only one of the surfaces of the first fixing portion and the corresponding surface of the second fixing portion along the extending direction may rub against each other.

(13) In the above embodiments, the fixing direction in which the first fixing portions are fixed in the respective second fixing portions is along the direction perpendicular to the plate surface of the liquid crystal panel. However, the fixing direction may be set to a direction parallel to the plate surface of the liquid crystal panel (along the X-Y plane). In this case, the lock structures of the joint parts and the elongated parts may be provided on or in the surfaces of the joint parts and the elongated parts parallel to the plate surface to the liquid crystal panel.

(14) In the above embodiments, the first fixing portions and the second fixing portions are provided in the end portions of the joint parts and the elongated parts, respectively. However, they may be provided in different portions. For example, the fixing portions may be provided at the middle portions.

(15) In the above embodiments, the frame is made of resin. However, the frame may be made of metal. When the bezel and the holding fixture have the block structures and the displacement allowance structures as in embodiments (1) and (2), the bezel and the holding fixture may be made of metal.

(16) In the above embodiments, the frame is mounted to the cabinets and the chassis. However, the frame may be mounted to either the cabinets or the chassis.

(17) In the second embodiment, the joint parts, each of which is prepared by connecting the short-side elongated part and the joint part of the first embodiment, are used. However, each joint part may be prepared by connecting the long-side elongated part and the joint part of the first embodiment.

(18) As a modification of the third embodiment, elongated parts may be prepared by connecting the joint parts provided at the short-side elongated part to adjacent elongated parts so as to form a portal shape in plan view. Similarly to the second embodiment, the number of parts and the number of steps can be reduced.

(19) In the above embodiments, the rubber holders are attached to the ends of each cold cathode tube. However, the technology disclosed in this application can be applied to a backlight including ferrules or outer leads provided at ends of a cold cathode tube and connected to a terminal of a connecter attached to a chassis so that power is supplied from an inverter board.

(20) In the above embodiments, the cold cathode tubes are used as light sources. However, other kinds of light sources including hot cathode tubes can be used.

(21) In the above embodiments, the cold cathode tubes that are linear light sources are used as light sources. However, point light sources such as LEDs may be used as light sources.

(22) In the above embodiments, the TFTs are used as switching components of the liquid crystal display device. However, the technology described the above can be applied to liquid crystal display devices including switching components other than TFTs (e.g., thin film diode (TFD)). Moreover, the technology can be applied to not only color liquid crystal display devices but also black-and-white liquid crystal display devices.

(23) In the above embodiments, the liquid crystal display device including the liquid crystal panel as a display component is used. The technology can be applied to display devices including other types of display components.

(24) In the above embodiments, the television receiver including the tuner is used. However, the technology can be applied to a display device without the tuner.

The invention claimed is:

1. A display device comprising:
a plate capable of light transmission;
a holding fixture formed in a frame-like shape with a plurality of elongated parts extending along edges of the plate and a plurality of joint parts connecting the elongated parts, the holding fixture holding the edges of the plate;
a mount to which the holding fixture is mounted;
mounting structures provided in the joint parts of the holding fixture and the mount for holding the holding fixture and the mount in a condition that the holding fixture is mounted to the mount; and
displacement allowance structures provided in joint portions of the elongated parts and the joint parts for allowing movements of the elongated parts relative to the joint parts along extending direction in which the elongated parts extend, the displacement allowance structures include first fixing portions provided in the joint parts and second fixing portions provided in the elongated parts such that each first fixing portion and each second fixing portion are fixed to each other with a clearance between the first fixing portion and the second fixing portion in the extending direction.

2. The display device according to claim 1, wherein the first fixing portions are protrusions and the second fixing portions are holes receiving the first fixing portions.

3. The display device according to claim 2, wherein the second fixing portions are through holes extending through the elongated parts.

4. The display device according to claim 3, further comprising a second holding fixture arranged on an opposite side of the holding fixture with respect to the plate such that the plate is held between the holding fixture and the second holding fixture, wherein:

the first fixing portions fixed in the second fixing portions are opposite the second holding fixture; and each first fixing portion has a positioning structure for positioning the second holding fixture relative to directions along a plate surface of the plate.

5. The display device according to claim 3, further comprising a second holding fixture arranged on an opposite side of the holding fixture with respect to the plate such that the plate is held between the holding fixture and the second holding fixture, wherein:

the first fixing portions fixed in the second fixing portions are opposite the second holding fixture; and each first fixing portion has a fixing structure for holding the second holding fixture in a condition that the second holding fixture is mounted.

6. The display device according to claim 3, wherein each elongated part includes a supplementary support portion at an inner edge of the second fixing portion, the supplementary support portion projecting in a direction that crosses the plate surface of the plate and an inner surface thereof being in contact with an outer surface of the first fixing portion.

7. The display device according to claim 6, wherein the supplementary support portion is formed such that a distal-end surface thereof and a distal-end surface of the first fixing portion are substantially on the same plane.

8. The display device according to claim 6, wherein the supplementary support portion is formed such that a distal-end surface thereof is located lower than a distal-end surface of the first fixing portion.

9. The display device according to claim 1, wherein:

each first fixing portion and each second fixing portion are fixed to each other in a fixing direction that crosses the plate surface of the plate; and any one of each first fixing portion and each second fixing portion, whichever is a hole, has a closed-end ring inner edge.

10. The display device according to claim 1, wherein each first fixing portion has a pair of surfaces that rub against surfaces of each second fixing portion, the surfaces being along the extending direction.

11. The display device according to claim 1, wherein:

each first fixing portion and each second fixing portion are fixed to each other in a fixing direction that crosses the plate surface of the plate;

each joint part and each elongated part have lock structures for restricting relative movements thereof in an opposite direction to the fixing direction; and the lock structures include the displacement allowance structures.

12. The display device according to claim 1, wherein any one of each first fixing portion and each second fixing portion, whichever is a protrusion, has a recess in a surface along the extending direction such that a gap is provided between the first fixing portion and the second fixing portion, and is in line contact with the other one of the first fixing portion and the second fixing portion at a plurality of positions.

13. The display device according to claim 1, wherein:

the joint parts form corners of the holding fixture; and the mounting structures are provided at the corners.

14. The display device according to claim 1, wherein the displacement allowance structures are provided at end portions of the joint parts and the elongated parts.

15. The display device according to claim 1, wherein the holding fixture is made of resin.

16. The display device according to claim 1, wherein:

each elongated part includes a positioning portion that is in contact with the edge of the plate and positions the plate in a direction along the plate surface of the plate; and a contact surface of the positioning portion in contact with the edge of the plate is formed along the extending direction.

17. The display device according to claim 1, wherein the mount is an exterior trim part that holds the plate and the holding fixture from an outside.

18. The display device according to claim 1, wherein the plate is a display panel configured to display images.

19. The display device according to claim 18, wherein the holding fixture is a frame that supports the display panel from a side opposite from a display surface of the display panel.

20. The display device according to claim 18, wherein the holding fixture is a bezel that holds the display panel from a display surface side of the display panel.

21. The display device according to claim 19, wherein the display panel is a liquid crystal display panel including a pair of substrates and liquid crystals sealed between the substrates.

22. The display device according to claim 21, further comprising a lighting device arranged on an opposite side of the liquid crystal panel with respect to the display surface including:

a light source;

a chassis housing the light source and having an opening on a liquid crystal panel side;

an optical member arranged so as to cover the opening, wherein the plate is the optical member.

23. The display device according to claim 22, wherein the holding fixture is a frame that holds the optical member from the liquid crystal panel side.

24. The display device according to any claim 22, wherein the mount is the chassis.

25. A television receiver comprising the display device according to claim 1.

* * * * *